United States Patent
McCarthy

(10) Patent No.: US 10,977,704 B2
(45) Date of Patent: Apr. 13, 2021

(54) IN STORE VOICE PICKING SYSTEM

(71) Applicant: Intelligrated Headquarters, LLC, Mason, OH (US)

(72) Inventor: Michael Donovan McCarthy, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 262 days.

(21) Appl. No.: 15/862,284

(22) Filed: Jan. 4, 2018

(65) Prior Publication Data

US 2018/0130110 A1 May 10, 2018

Related U.S. Application Data

(63) Continuation of application No. 14/627,933, filed on Feb. 20, 2015, now Pat. No. 9,928,531.

(60) Provisional application No. 61/955,548, filed on Mar. 19, 2014.

(51) Int. Cl.
*G06Q 30/00* (2012.01)
*G06Q 30/06* (2012.01)

(52) U.S. Cl.
CPC ..... *G06Q 30/0617* (2013.01); *G06Q 30/0635* (2013.01); *G06Q 30/0639* (2013.01)

(58) Field of Classification Search
None
See application file for complete search history.

(56) References Cited

U.S. PATENT DOCUMENTS

| 5,047,614 A | 9/1991 | Bianco |
| 5,158,155 A | 10/1992 | Domain et al. |
| 5,724,526 A | 3/1998 | Kunita |
| 7,010,501 B1 | 3/2006 | Roslak et al. |
| 7,040,541 B2 | 5/2006 | Swartz et al. |
| 7,171,377 B2* | 1/2007 | Ogasawara .......... G06Q 10/087 414/14 |
| 7,224,786 B2* | 5/2007 | Daugherty .............. G06F 21/32 379/114.14 |
| 7,346,564 B1 | 3/2008 | Kirklin et al. |

(Continued)

FOREIGN PATENT DOCUMENTS

| AU | 2013213736 A1 | 8/2013 |
| AU | 2013270536 A1 | 1/2014 |

(Continued)

OTHER PUBLICATIONS

Mina Williams; "Technically Picking; New Technologies Are Changing the Way Orders Get 'Picked' in the Warehouse"; Oct. 22, 2001; Penton Media, Inc.; Supermarket News: 21 (Year: 2001).*

(Continued)

*Primary Examiner* — Naeem U Haq
*Assistant Examiner* — Norman Donald Sutch, Jr.
(74) *Attorney, Agent, or Firm* — Alston & Bird LLP

(57) ABSTRACT

Systems, methods, devices, and non-transitory processor readable media of the various embodiments enable in store voice picking systems. In various embodiments, an end-to-end voice ordering and fulfillment system for a retail store may enable a customer to place an order over the phone, a personal shopper to be directed to fill the order via voice commands, and the order to be made available for pickup at the retail store by the customer or delivered to the customer from the retail store.

17 Claims, 31 Drawing Sheets

(56) References Cited

U.S. PATENT DOCUMENTS

| | | | |
|---|---|---|---|
| 7,516,848 B1* | 4/2009 | Shakes | B07C 5/38 |
| | | | 209/34 |
| 7,672,876 B2 | 3/2010 | Bonner et al. | |
| 7,762,458 B2 | 7/2010 | Stawar et al. | |
| 7,853,492 B1* | 12/2010 | Kirklin | G06Q 30/06 |
| | | | 280/79.2 |
| 8,244,603 B1* | 8/2012 | Tang | G06Q 10/087 |
| | | | 705/28 |
| 8,504,413 B1* | 8/2013 | Rowe | G06Q 10/08 |
| | | | 705/26.2 |
| 8,611,919 B2 | 12/2013 | Barnes, Jr. | |
| 8,612,294 B1 | 12/2013 | Treyz et al. | |
| 9,292,853 B2* | 3/2016 | Ascarrunz | G07G 1/0081 |
| 2001/0018671 A1 | 8/2001 | Ogasawara | |
| 2002/0032613 A1 | 3/2002 | Buettgenbach et al. | |
| 2002/0055906 A1 | 5/2002 | Katz et al. | |
| 2002/0116301 A1 | 8/2002 | Chapman | |
| 2003/0177072 A1 | 9/2003 | Bared | |
| 2004/0143560 A1 | 7/2004 | Zhu | |
| 2005/0165647 A1 | 7/2005 | Razumov | |
| 2005/0165648 A1 | 7/2005 | Razumov | |
| 2005/0187819 A1* | 8/2005 | Johnson | B62B 3/1424 |
| | | | 705/14.42 |
| 2005/0218217 A1 | 10/2005 | Hasegawa | |
| 2006/0178943 A1 | 8/2006 | Rollinson et al. | |
| 2006/0259369 A1 | 11/2006 | Bongrazio | |
| 2006/0289637 A1 | 12/2006 | Brice et al. | |
| 2007/0080930 A1 | 4/2007 | Logan et al. | |
| 2007/0088624 A1 | 4/2007 | Vaughn et al. | |
| 2007/0088628 A1 | 4/2007 | Hopson | |
| 2009/0125394 A1 | 5/2009 | Otto et al. | |
| 2009/0281921 A1 | 11/2009 | Foster | |
| 2009/0304161 A1 | 12/2009 | Pettyjohn | |
| 2010/0138037 A1 | 6/2010 | Adelberg et al. | |
| 2011/0084127 A1 | 4/2011 | Grant | |
| 2012/0158385 A1* | 6/2012 | Arunapuram | G06Q 10/04 |
| | | | 703/6 |
| 2012/0191522 A1 | 7/2012 | McLaughlin et al. | |
| 2013/0030955 A1 | 1/2013 | David | |
| 2013/0073477 A1 | 3/2013 | Grinberg | |
| 2013/0222116 A1 | 8/2013 | Barry, III | |
| 2013/0226651 A1 | 8/2013 | Napper | |
| 2013/0312371 A1 | 11/2013 | Ambrose | |
| 2014/0136255 A1* | 5/2014 | Grabovski | G06Q 10/063112 |
| | | | 705/7.14 |
| 2014/0195372 A1* | 7/2014 | Bassemir | G06Q 30/0639 |
| | | | 705/26.8 |
| 2014/0279294 A1* | 9/2014 | Field-Darragh | G06Q 10/087 |
| | | | 705/28 |
| 2014/0324725 A1* | 10/2014 | Edmonds | G06Q 10/0835 |
| | | | 705/333 |
| 2015/0025967 A1 | 1/2015 | Ellison | |
| 2015/0206121 A1* | 7/2015 | Joseph | G06Q 30/0633 |
| | | | 705/23 |
| 2016/0042440 A1 | 2/2016 | Francis | |
| 2016/0194153 A1* | 7/2016 | Issing | B65G 1/1378 |
| | | | 700/216 |
| 2016/0210582 A1* | 7/2016 | Carmona | G06Q 10/063118 |

FOREIGN PATENT DOCUMENTS

| | | |
|---|---|---|
| DE | 102012100354 A1 | 7/2013 |
| WO | WO-2013/126048 | 8/2013 |

OTHER PUBLICATIONS

Cain-Miller, C. "Do People Actually Shop on Phones? The Answer is Decidedly Yes", Jan. 9, 2013, The New York Times, https://bits.blogs.nytimes.com/2013/01/09/do-people-actually-shop-on-phones-the-answer-is-decidedly-yes/.

Eisenstein, D., "Analysis and Optimal Design of Discrete Order Picking Technologies Along a Line", Feb. 15, 2008, Wiley InterScience (www.interscience.wiley.com).

ZIH Corp., "Mobile Printing Streamlines Supply Chain and Warehouse Processes", 2013.

Applicant Initiated Interview Summary (PTOL-413) dated May 30, 2017 for U.S. Appl. No. 14/627,933.

Examiner initiated interview summary (PTOL-413B) dated Oct. 5, 2017 for U.S. Appl. No. 14/627,933.

Examiner initiated interview summary (PTOL-413B) dated Sep. 26, 2017 for U.S. Appl. No. 14/627,933.

Final Rejection dated Sep. 8, 2017 for U.S. Appl. No. 14/627,933.

Non-Final Rejection dated May 4, 2017 for U.S. Appl. No. 14/627,933.

Notice of Allowance and Fees Due (PTOL-85) dated Mar. 1, 2018 for U.S. Appl. No. 14/627,933.

Notice of Allowance and Fees Due (PTOL-85) dated Oct. 5, 2017 for U.S. Appl. No. 14/627,933.

* cited by examiner

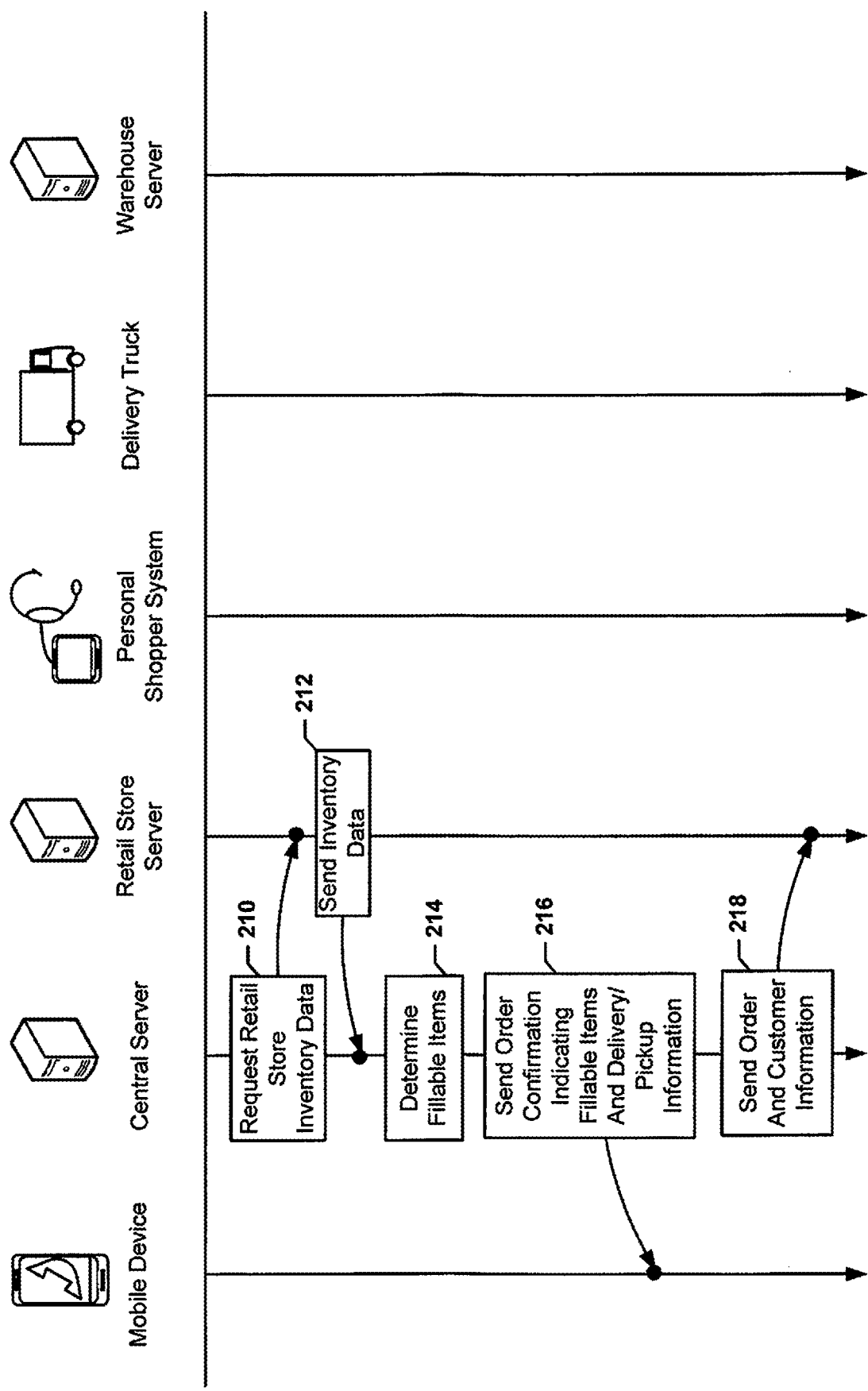

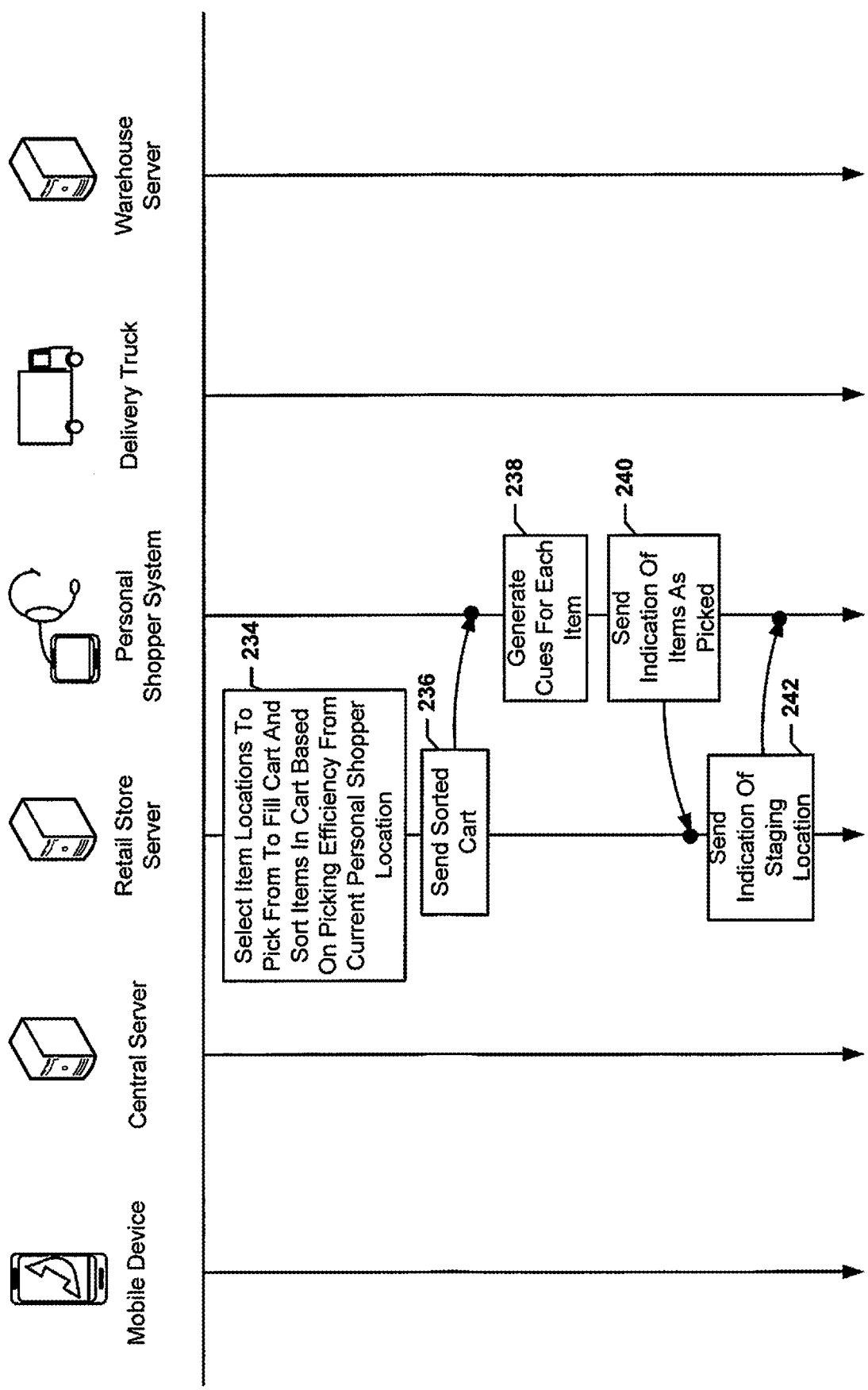

DOM DPC CONFIGURATION TOOL

02/20/2014 15:05:45
KNIGHTED SPRING

| | TYPE | DECISION FLOW NAME | DESCRIPTION | CREATED BY | DATE/TIME |
|---|---|---|---|---|---|
| | EMERG | DISASTER IN SOUTH EAST REGION | RETAIL STORES ARE THE PREFERRED SHIP LOCATIONS | SPRING, KNIGHTED | 02/19/2014 19:29:48 |
| | HOLDY | HOLIDAY STORE SHIP PREFERRED | RETAIL STORES ARE THE PREFERRED SHIP LOCATIONS, ON TIME DELIVERY EMPHASIS | SPRING, KNIGHTED | 02/19/2014 19:29:48 |
| | STD | STORE SHIP PREFERRED | RETAIL STORES ARE THE PREFERRED SHIP LOCATIONS | SPRING, KNIGHTED | 02/19/2014 19:29:48 |

Sidebar:
- LOGO
- DOM
- DOM ACTION TYPE SETUP
- DOM ACTIONS
- DOM DPC CONFIGURATION TOOL
- DOM DECISION FLOW TYPE SETUP
- DOM EXIT TYPE SETUP
- DOM EXITS
- DOM FACTOR GROUP SETUP
- DOM FACTORS
- DOM REPORT HISTORY LOOKUP
- DPC
- EMPLOYEE SETUP
- EMPLOYEE UPDATE
- EVENT
- GENERAL Buttons: ADD | UPDATE | DELETE | SET UP | DECISION FLOW | COPY

FIG. 18

| Seq | PROCESS | DECISION FACTOR | FACTOR POINTS | DECISION POINTS |
|---|---|---|---|---|
| 1 | COMMENT | ** 1 STORE 100% FULFIL, ORDER BY [ | | |
| 2 | FACTOR | 100% FULFILLMENT FROM 1 SHIP POINT (STORE ONLY) | 100 | 100 |
| 3 | ACTION | TURN OFF FILTERING SHIP POINTS | | 0 |
| 4 | FACTOR | DISTANCE ZONE 1 (1 - CLOSEST ZONE) | 400 | 400 |
| 5 | FACTOR | DISTANCE ZONE 2 | 300 | 700 |
| 6 | FACTOR | DISTANCE ZONE 3 | 200 | 900 |
| 7 | EXIT | TOTAL POINTS GE nn - EXIT WITH RESERVED INVENTORY | | 200 |
| 8 | ACTION | RESET POINTS AND SHIP POINTS | | 0 |
| 9 | COMMENT | ** 1 DC 100% FULFIL, ORDER BY DISTA | 100 | 100 |
| 10 | FACTOR | 100% FULFILLMENT FROM 1 SHIP POINT (DC ONLY) | 100 | 100 |
| 11 | ACTION | TURN OFF FILTERING SHIP POINTS | | 0 |
| 12 | FACTOR | DISTANCE ZONE 1 (1 - CLOSEST ZONE) | 400 | 400 |
| 13 | FACTOR | DISTANCE ZONE 2 | 300 | 700 |
| 14 | FACTOR | DISTANCE ZONE 3 | 200 | 900 |
| 15 | EXIT | TOTAL POINTS GE nn - EXIT WITH RESERVED INVENTORY | | 200 |
| 16 | ACTION | RESET POINTS AND SHIP POINTS | | 0 |
| 17 | COMMENT | ** 2 DC 100% FULFIL, ORDER BY DISTA | | |
| 18 | FACTOR | 100% FULFILLMENT FROM 2 SHIP POINT (DC ONLY) | 100 | 100 |
| 19 | ACTION | TURN OFF FILTERING SHIP POINTS | | 0 |
| 20 | FACTOR | DISTANCE ZONE 1 (1 - CLOSEST ZONE) | 400 | 400 |
| 21 | FACTOR | DISTANCE ZONE 2 | 300 | 700 |
| 22 | FACTOR | DISTANCE ZONE 3 | 200 | 900 |
| 23 | EXIT | TOTAL POINTS GE nn - EXIT WITH RESERVED INVENTORY | | 200 |
| 24 | ACTION | RESET POINTS AND SHIP POINTS | | 0 |
| 25 | COMMENT | ** ANY SET OF DC 100% FULFIL | | |
| 26 | FACTOR | 100% FULFILLMENT FROM ANY SET OF DCs | 100 | 100 |
| 27 | EXIT | TOTAL POINTS GE nn - EXIT WITH RESERVED INVENTORY | | 100 |
| 28 | ACTION | RESET POINTS AND SHIP POINTS | | 0 |
| 29 | COMMENT | ** UNABLE TO GET 100% FULFIL | | |
| 30 | FACTOR | DISTANCE ZONE 1 (1 - CLOSET ZONE) | 1 | 1 |
| 31 | EXIT | UNABLE TO FULFILL ORDER | | 0 |

FIG. 20

IN STORE VOICE PICKING SYSTEM

RELATED APPLICATIONS

This application is a continuation of U.S. Non Provisional patent application Ser. No. 14/627,933 filed Feb. 20, 2015, entitled "IN STORE VOICE PICKING SYSTEM" which claims priority to U.S. Provisional Patent Application Ser. No. 61/955,548, filed Mar. 19, 2014, entitled "In Store Voice Picking System." Additional related applications include U.S. Provisional Patent Application Ser. No. 61/943,671, filed Feb. 24, 2014, entitled "Distributed Order Management," and U.S. Provisional Patent Application Ser. No. 61/945,985, filed Feb. 28, 2014, entitled "Distributed Order Management." The entire contents of all four applications are incorporated by reference herein in their entirety.

BACKGROUND

Traditional "brick and mortar" retailers, such as grocery stores, are often in close proximity to customers based on the presence of the traditional "brick and mortar" retail stores in customers' towns and neighborhoods. However, despite their close proximity to customers, traditional "brick and mortar" retailers, such as grocery stores, have faced challenges in competing with electronic commerce ("e-commerce") retailers who ship from distribution centers or warehouses directly to customers.

As an example, some customers may prefer the ease and speed of ordering via websites over the time needed to enter a traditional "brick and mortar" retail store, select items, and complete a checkout process to pay for items. A drawback to the web based ordering model may be the shipping time necessary to move the items from the distribution center or warehouse to the customer. To reduce the time associated with shipping items from distribution centers or warehouses, e-commerce retailers are attempting to move distribution centers or warehouses ever closer to customers, driving up e-commerce retailer infrastructure costs. Another drawback to the web based order model may be that customers are forced to use a website to place an order, however customers are not always capable of accessing a website, for example when driving a car.

Additionally, retailers, including both traditional "brick and mortar" retailers and electronic commerce ("e-commerce") retailers, may have multiple locations and/or multiple sources in their supply chains from which orders for items may be filled. Current order management systems cannot support the needs of retailers to fill orders from multiple locations and/or multiple sources.

SUMMARY

The systems, methods, devices, and non-transitory processor readable media of the various embodiments enable in store voice picking systems. In various embodiments, an end-to-end voice ordering and fulfillment system for a retail store may enable a customer to place an order over the phone, a personal shopper to be directed to fill the order via voice commands, and the order to be made available for pickup at the retail store by the customer or delivered to the customer from the retail store. In various embodiments, orders may be placed by customer's using voice inputs to an automated voice ordering system and/or via inputs via an ordering website. In various embodiments, a central server may receive the order, identify the customer, associate the customer with his or her account, select a retail store from which to fill the customer's order, and/or provide the order to the selected retail store. In various embodiments, a retail store server may select a personal shopper to pick the items for the order and provide commands (e.g., voice commands) to the personal shopper to guide the personal shopper to pick the order. In various embodiments, a completed order may be made available for pickup by the customer at the retail store or may be delivered (e.g., via local delivery truck) to the customer's location. In another embodiment, a personal shopper system including a headset may be provided to a customer in the store to assist the customer in finding items as the customer shops. In an embodiment, the personal shopper system may include a customized cart configured to assist the personal shopper in picking items for an order.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 2A-2E are a process flow diagram illustrating an embodiment method for in store order fulfillment via voice directed picking.

FIGS. 18-22 are screen shots of an example decision flow creation tool according to an embodiment for generating a user configurable decision flow for an embodiment DOM system.

DETAILED DESCRIPTION

Figure 1:
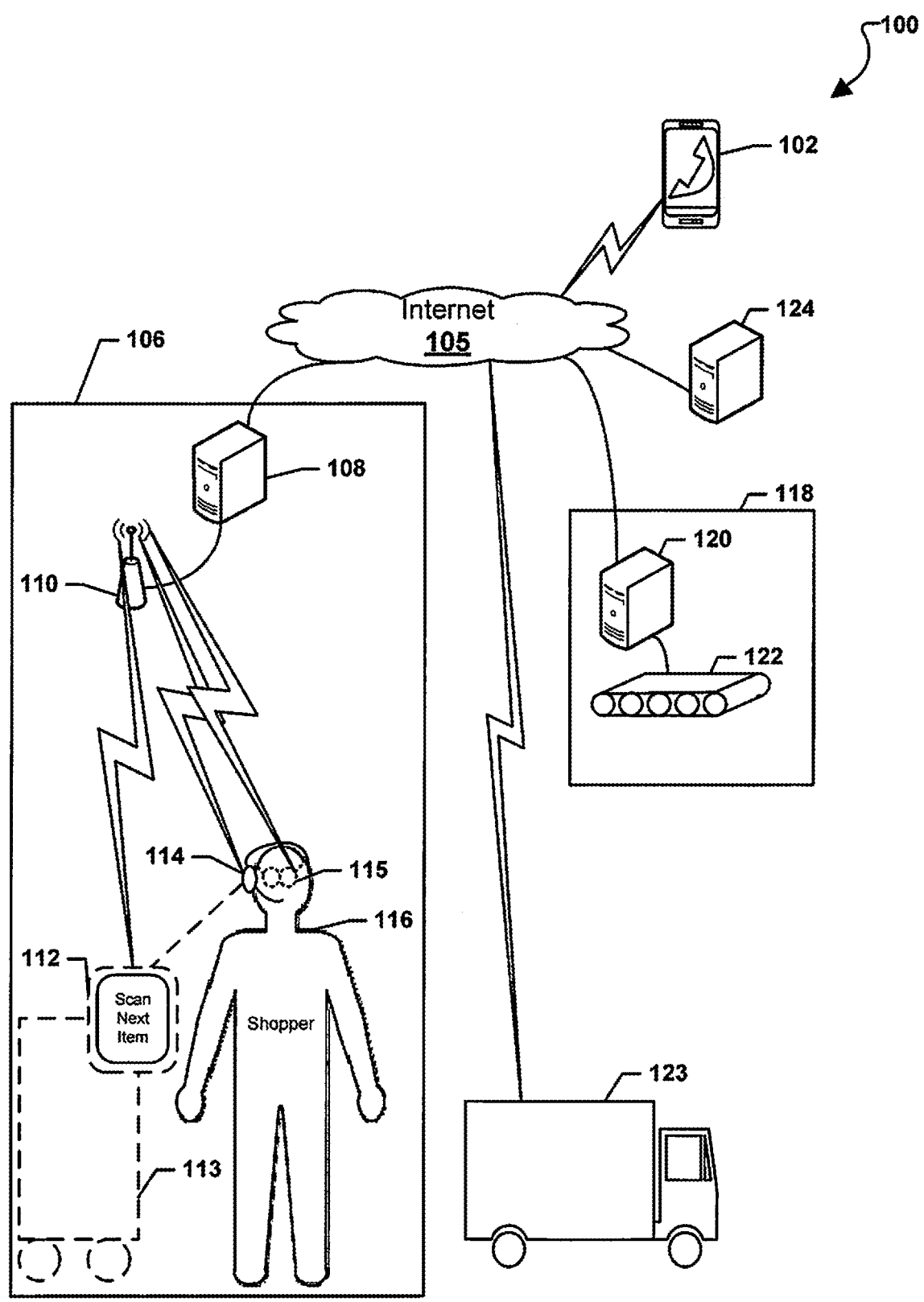
FIG. 1 is a communication system block diagram of a network suitable for use with the various embodiments.
Figure 2A:
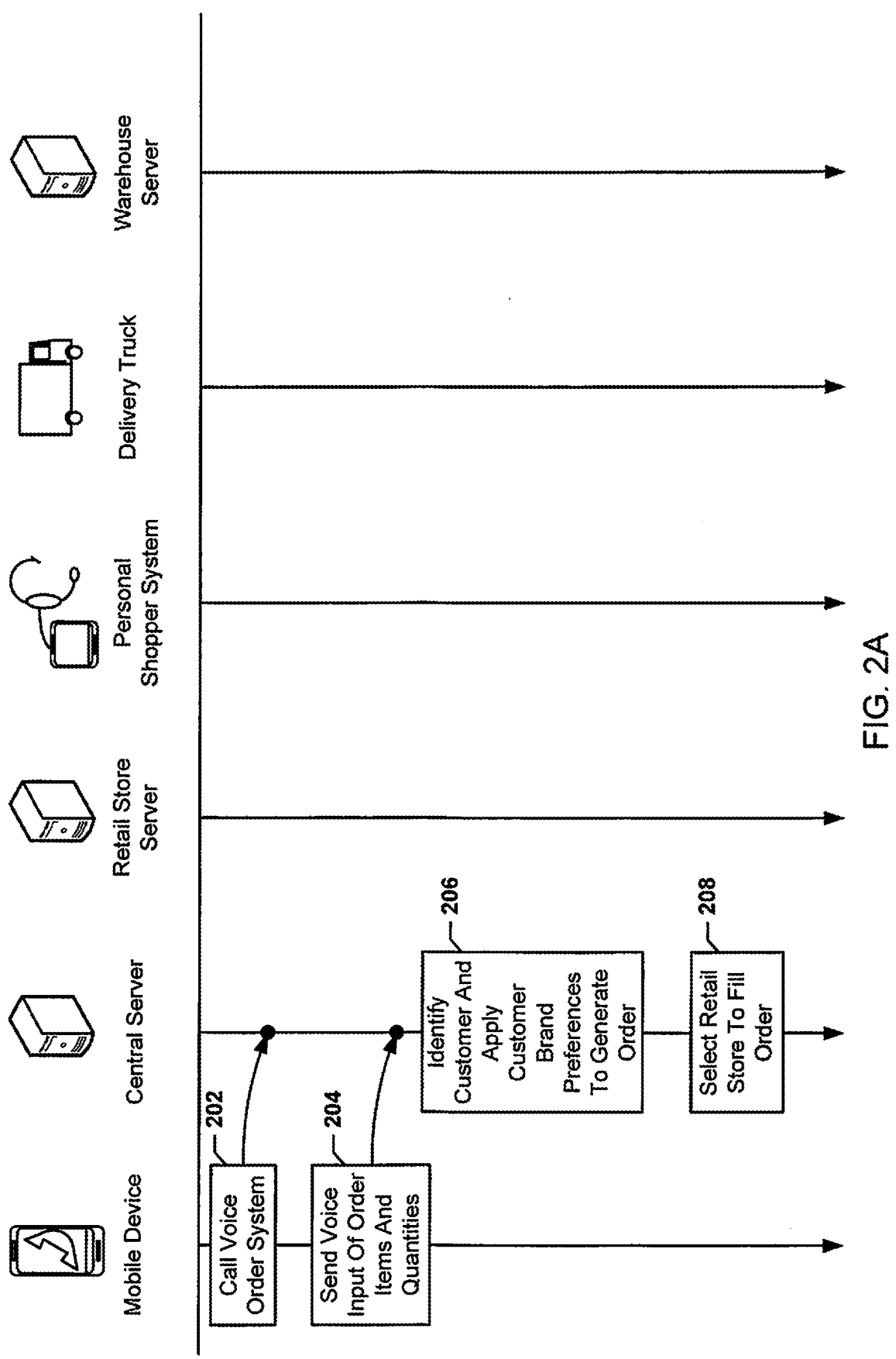
Figure 2C:
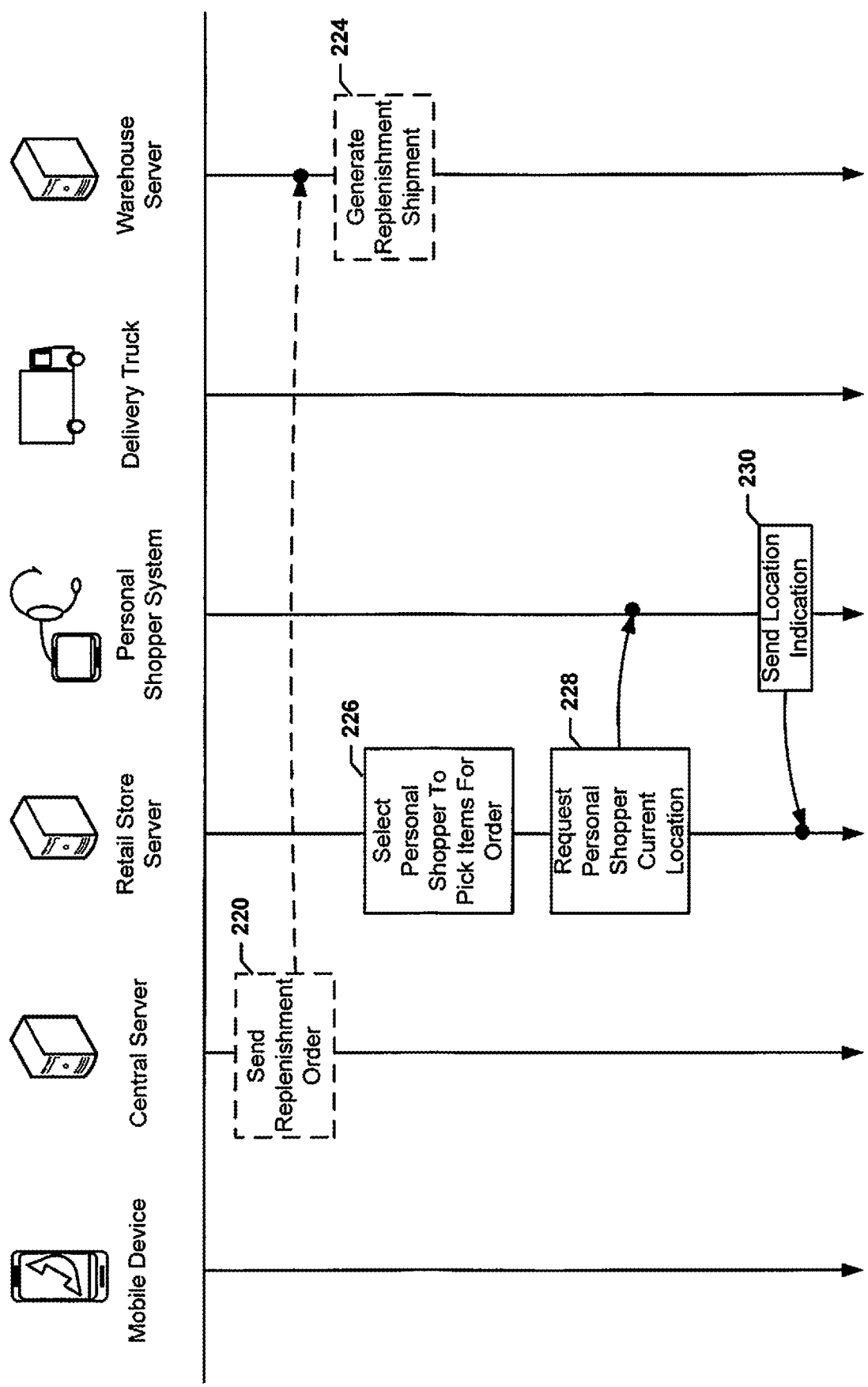
Figure 2E:
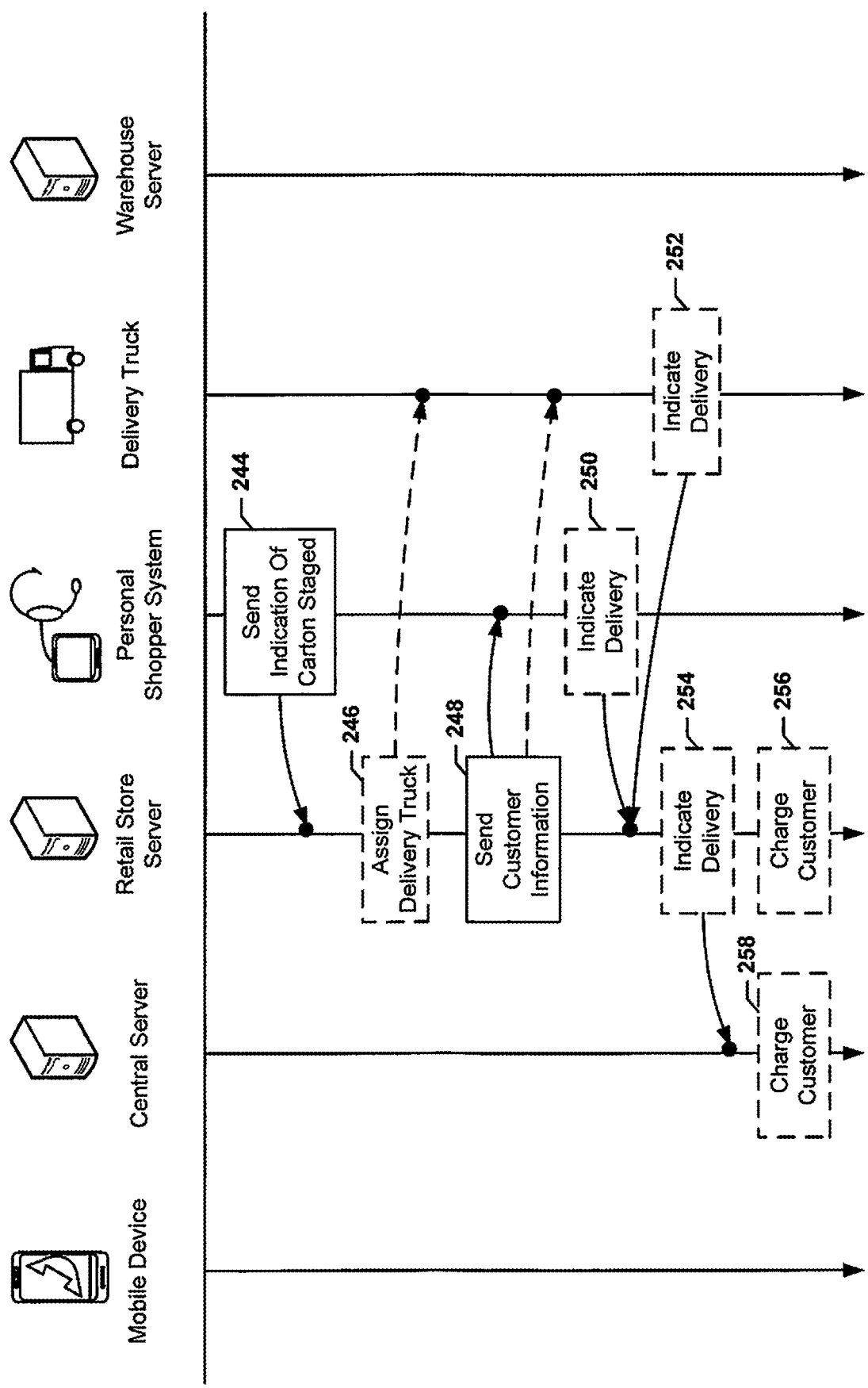

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of desktop computers, cellular telephones, smart phones, personal or mobile multimedia players, personal data assistants (PDA's), laptop computers, tablet computers, smart books, retail terminals, palm-top computers, wireless electronic mail receivers, wireless mobile headset devices, inventory scanners, multimedia Internet enabled cellular telephones, wireless gaming controllers, and similar electronic devices which include a programmable processor and memory and circuitry for performing operations discussed herein.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The various embodiments are described herein using the term "retail store." The term "retail store" is used to refer to a location configured to physically display and sell items for direct selection and purchase by customers physically shopping within the location. Retail stores, unlike a distribution center of warehouse, often have dynamic floor plans which require constant movement of product, shelves and product displays (e.g., to support promotions and/or seasonal items). The selections and purchases by a customer in a retail store are often much more random and unpredictable when compared with orders fulfilled in a distribution center or warehouse which are generally configured to support concentrated high density picks of items to fulfill orders.

The various embodiments and examples may be described herein with reference to grocery stores as a retail store. Grocery stores are used merely as an example of a retail store to better illustrate the aspects of the various embodiments and are not intended to limit the various embodiments in any way. Other retail stores, such as electronics stores, book stores, etc., may be substituted in the various examples without departing from the spirit or scope of the invention.

The systems, methods, devices, and non-transitory processor readable media of the various embodiments enable in store voice picking systems. In various embodiments, an end-to-end voice ordering and fulfillment system for a retail store may enable a customer to place an order over the phone, a personal shopper to be directed to fill the order via voice commands, and the order to be made available for pickup at the retail store by the customer or delivered to the customer from the retail store. The various embodiments may enable a retail store to operate as an order fulfillment point without requiring the installation of material handling equipment, such as conveyors, pick walls, etc., and/or the interruption of the operations of the retail store in supporting customers shopping in the retail store. Additionally, the various embodiments may enable a retail store to be operated around the clock as an order fulfillment point, during normal shopping hours and outside of normal shopping hours. The various embodiments may not change interactions between retail stores and warehouses. The various embodiments may provide repeatable and reusable methods for utilizing retail stores as fulfillment centers.

In various embodiments, orders may be placed by customer's using voice inputs to an automated voice ordering system. In an embodiment, a customer may call into a voice ordering system using his or her mobile device, such as a smart phone. The voice ordering system may be hosted by a central server or a retail store server. The ability to call in order may be particularly useful for customers to place orders via a hands free phone while driving which may be legal, versus using a phone based application requiring key based entries which cannot be used while driving in most states and may present a hazard and inconvenience regardless of legality. The voice ordering system may identify the customer. In an embodiment, the customer may provide a customer ID, such as a store account number, etc. In another embodiment, the voice ordering system may identify the customer based on a stored voice signature for the customer by comparing the customer's voice during the call to the stored voice signatures and thereby associate the customer with the customer's account information. In another embodiment, the voice ordering system may identify the customer based on the caller identification cross referenced to the phone number uploaded to a customer's profile.

Customer account information may include customer preferences associated with the customer. The customer preferences may be based on historical order information for the customer and/or may be preconfigured by the customer prior to using the voice ordering system. As an example, the customer may complete an online profile using the retail store chain's website. The customer preferences may include a preferred language, brand preferences, quantity preferences, delivery preferences (e.g., time of day, primary delivery location), pick up preferences, a customer's address, customer identifying information (e.g., an image of the customer), etc. In an embodiment, the brand preferences and/or quantity preferences of a customer may enable the customer to merely generally identify items, such as by saying "a dozen eggs, one butter, one milk, one cheese, and a six pack of beer," and these general item identifications may be mapped to the specific brands and/or quantities identified in the customer's brand preferences and/or quantity preferences, such as "a dozen Egglands Best® eggs, one pound of Land-o-Lakes® butter, one gallon of Marva Maid® milk, one pound of Land-o-Lakes cheese, and a six pack of Budweiser® beer." In an embodiment, the customer may speak his or her order and the voice ordering system may generate a spoken confirmation of the order. The voice ordering system may also generate a spoken indication of the pickup information for the order, such as a pick up door, pick up time, etc. For delivery orders the voice ordering system may generate a spoken indication of delivery information for the order, such as an estimated delivery time, etc. The ability to take voice orders may be advantageous to customers unable to place orders via a website, such as customers driving a motor vehicle, customers without an Internet connection, etc. Customer preferences may enable customers to configure which items they prefer as well as short cut words to assist in ordering. For example, a customer may configure the word "eggs" to enable their typical quantity and brand of eggs to be ordered. Another customer preference may be a store and language option that may be identified through unique phone numbers for different language usage at each store. For example, one number for a store may be associated with English language orders while dialing another number for the store may be associated with Spanish language orders.

In an embodiment, in addition to or in place of voice ordering, the central server and/or retail store server may receive on-line orders via a website. In an embodiment, the central server and/or retail server may charge the customer's account or credit card at the time of ordering. In another embodiment, the customer may not be charged until he or she receives their order via in-store pick up or delivery. In an embodiment, a voice print identification may be used to authorize and/or verify authorization for payment for an order.

In the various embodiments, orders for items may not be restricted based on order type, storage requirements, packaging requirements, or other considerations. As long as the items are available in the store, items may be selected in any order. This flexibility may be realized because the items may be picked by hand by personal shoppers, because the time between picking the items and pick up or delivery of the items may be small enough that concerns about spoliation may be minimized, and because local delivery or pick up may be utilized eliminating automated shipping system concerns and shipping costs. For example, orders may mix crushable items, refrigerated items, and frozen items together in one order and the same personal shopper may pick all the crushable items, refrigerated items, and frozen items.

In the various embodiments, an ordering system may be configured to accept orders in more than one language, such as any number of different languages including in two different languages, three different languages, sixty five different languages, etc. In this manner, a customer may speak in his or her native language and the voice ordering system may identify items and quantities for his or her order and respond to the customer in his or her native language.

In various embodiments, a central server may host an ordering system (e.g., a voice ordering system and/or a web based ordering system). The central server may receive an order, identify the customer, associate the customer with his or her account, select a retail store from which to fill the customer's order, and/or provide the order to the selected retail store. In an embodiment, a central server may select a retail store based on the customer's preference. In another embodiment, the central server may select a retail store based on the customer's current location.

In various embodiments, a retail store server may host an ordering system (e.g., a voice ordering system and/or a web based ordering system). The retail store server may receive an order, identify the customer, and/or associate the customer with his or her account.

Whether orders are taken by a central server and/or a retail store server, in various embodiments, a retail store server may select a personal shopper to pick the items for the order (or cart) and provide commands (e.g., voice commands, visual commands, etc.) to the personal shopper to guide the personal shopper to pick the items of the order. In an embodiment, a personal shopper may be a retail store employee using a personal shopper system. A personal shopper system may be comprised of one or more device, such as a headset with a speaker and microphone, a visual display (e.g., a tablet, retail scanner, goggle display, etc.), a customized cart, etc., that may enable a retail store server to provide indications to a personal shopper to direct the personal shopper in picking items for an order (or cart). In an embodiment, the retail store server may select a personal shopper based on availability and/or performance metrics, such as a time worked, average picking speed, distance traveled, qualification level, etc. to pick an order. In an embodiment, the retail store server may reassign personal shoppers from one task, such as working a cash register, to another task, such as picking items for an order, based on the number of customers currently in the store or other factors impacting staffing decisions. In this manner, the retail store server may utilize personal shopper systems worn by store employees to manage operations of a retail store, such as a grocery store. Additionally, the retail store server may track personal shopper performance and send incentives to the personal shopper to improve personal shopper output, such as pick speed. The various embodiments may also enable any individual to operate as a personal shopper because the personal shopper system may provide directions to that individual to guide his or her picking in the individual's native language.

Retail stores, unlike a distribution center or warehouse, may have dynamic floor plans which may require constant movement of product, shelves and product displays (e.g., to support promotions, seasonal item sales, etc.) In the various embodiments, the order contents received from a customer for picking in a retail store may be much more random and unpredictable when compared with orders fulfilled in a distribution center which are generally configured to support concentrated high density picks. In various embodiments, as items are stocked on shelves, freezers, or displays within a retail store, the put away location of the items may be identified and recorded and input into a product locator module of retail store server and/or central server. Additionally, the location of the employee (or personal shopper) may be identified as the employee may not be assigned to one "zone" or section of the retail store as employees generally are in a distribution center.

In an embodiment, a retail store server may determine the location of a personal shopper. Personal shopper systems may be configured to identify location information in various manners. As examples, a personal shopper system may include a GPS receiver and determine its current GPS coordinates (e.g., latitude, longitude, elevation, etc.), a personal shopper system may include a camera to detect light modulations indicating a portion of the store the personal shopper system is in, a personal shopper system may include a camera to detect indications on the store floor or store shelves of a location, a personal shopper system may include a barcode scanner and may send scanned barcode information as location information, a personal shopper system may triangulate its position based on received audio, radio, or light signals from transmitters in the retail store, a personal shopper system may include an radio frequency identification (RFID) reader to read RFID tags imbedded around the store indicating a location, and/or a personal shopper may input his or her current location (e.g., via a voice indication of their current isle). The retail store server may receive the location information from a personal shopper's personal shopper system and use the location information to determine the personal shopper system location.

In an embodiment, a retail store server may include an employee or personal shopper locator module. The retail store server may utilize RFID tags located at specific intervals along store aisles and walls within the retail store. The tags may indicate the approximate location of a worker with an RFID reader, such as an RFID reader on a personal shopper system headset or cart, by passing on a unique identification to an RFID reader when the tag is within sufficient proximity, e.g., 3 feet. The retail store server may cross reference that tag id to a location within the retail store through the use of a predesigned electronic layout that graphically identifies the location of the RFIDs. The planogram or store layout may be customizable and configurable by the user to essentially draw his store, shelves, freezers, etc. and "drag and drop" the RFID tags onto an electronic planogram or store layout as needed. This may enable a user to configure and customize the ever-changing layout of his or her store without any hard coding or configuration by the vendor for a specific retail store. In an embodiment, the graphical user interface may be used to change the location of and/or add items to locations, such as in a point and click type manner. In another embodiment, while the graphical user interface may be used to draw the store, to continually change the location of items within the retail store, an employee may upload new items and the location of those items through the use of the RFID location system described previously as well as a barcode scanner which may identify the item and in combination with the RFID location system upload the item and its location to the retail store server.

In an embodiment, the retail store server may sort items or an order (or cart) to be picked based at least in part on the current location of the personal shopper system of the personal shopper assigned to pick the items. In an embodiment, the retail store server may sort the items in an order that may be efficient and/or ergonomic for the personal shopper to traverse the store to gather the items. In an embodiment, the order may be sorted initial when sent to the personal shopper system. In another embodiment, the order may be continually resorted after each item is picked by the personal shopper. In the various embodiments, the retail store server may store item location information in a memory available to the retail store server. Item location information may be exact location information, such as information associated with a planogram indicating the aisle, aisle side, shelf, bay, and/or position assigned to an item, and/or item location information may be approximate information, such as merely an aisle associated with the item or an area associated with the item (e.g., "frozen foods section"). In an embodiment, the location of the items may be updated as inventory data is received, such as item scanning during put away events or cycle counts.

In an embodiment, the retail store server may determine a language preference for the selected personal shopper, and may output indications of the next item to be picked to the personal shopper via his or her personal shopping system in his or her selected language. In this manner, different personal shoppers may receive instructions in different languages. In an embodiment, the retail store server may provide indications of a next item to pick to a personal shopper system and the personal shopper system may output the indications to the personal shopper, such as a voice command indicating the next item, location of the next item, and the quantity to pick. In an embodiment, the next item may be the item name and size and may include other descriptions, such as color, label features, or an image of the item sent to a display of the personal shopper system. In an embodiment, the item location indication may be an exact indication, such as the item's, aisle, aisle side, shelf, bay, and position. In another embodiment, the item location indication may be a general indication such as merely an aisle, thereby leveraging the ability of the personal shopper to locate the item without the need for detailed location information based on the personal shopper's familiarity with the store and/or products. In an embodiment, the quantity to pick may be an indication of a number of items, item size, etc. In addition to item locations, in a further embodiment, the retail store server may send indications of travel instructions, such as turn by turn directions for the personal shopper to proceed from his or her current location to the next item to pick.

In an embodiment, a personal shopper may indicate the picking of each item as it is picked to the retail store server. For example, the personal shopper may speak into the personal shopper system indicating the item was picked and quantity. As other examples, the personal shopper may scan the item with a barcode scanner (e.g., a ring scanner) or a customized cart may image the item and the indication of the item may be sent to the retail store server. As a further example, the personal shopper may wear a bracelet or ring including an RFID tag that may be detected by the shelving unit in the retail store indicating the personal shopper's hand entered the item location.

In the various embodiments, a personal shopper may pick the items for an order (or cart) and box the items for pick up by the customer or delivery to the customer. In various embodiments, a completed order may be made available for pickup by the customer at the retail store or may be delivered (e.g., via local delivery truck) to the customer's location. In an embodiment, the retail store server may direct the personal shopper to the staging location for the order, such as a curbside pickup location or a loading dock. In an embodiment, a customer may drive up to the pickup location and a store employee may load the order into the customer's vehicle. In an embodiment, a central server may provide identifying information to the retail store, such as an e-mail with an image of the customer, to enable store employees, such as a personal shopper, to verify the customer's identity. When the order is to be delivered, the items may be loaded on a local delivery truck and delivered to the customer's address. In an embodiment, a delivery driver may call into the retail store server and/or central server to report the successful delivery of the items via his or her mobile device, such as a smart phone.

In an embodiment, a central server and/or retail store server may be in communication with a warehouse server or other replenishment system. In an embodiment, as carts or orders for items are generated the central server and/or retail store server may generate replenishment orders to the warehouse server or other replenishment system to restock the retail store inventory. In this manner, store replenishment may be automated as orders are received and filled.

In an embodiment, when a customer order is placed via the web or voice ordering system, the central server and/or retail store server may accumulate a number of orders until a personal shopper may be ready to begin a picking session. The central server and/or retail store server may utilize algorithms to prepare orders to be picked in an efficient manner based on various factors including the type of items (e.g., frozen, ambient, or chilled), the personal shopper's current location, the location of the items to be picked, etc. Once the optimal pick sequence is identified, the central server and/or retail store server may instruct the personal shopper to proceed to an approximate location within the store to begin the picking sequence in the proper order relative to the personal shopper's current location. Once the optimal start position is achieved, the central server and/or retail store server may relay picking orders via a personal shopper systems, such as a discreet earphone. For example, the central server and/or retail store server may generate audible indications in the personal shopper's language of "Aisle 5—soups—Campbell's tomato soup 12 oz." The central server and/or retail store server may prompt personal shoppers to move forward, turn, etc. based on continual RFID updates to provide systematic guidance to help the personal shoppers find the items. In an embodiment, personal shoppers based on their proficiency may turn on or off "layers" of support. For example, for an experienced personal shopper familiar with the retail store layout, after a certain amount of time, no spatial direction may be necessary.

In an embodiment, to minimize the impact of the in store picking to the in store customers (such as by personal shoppers talking to the voice directed picking system), the personal shopper may use a "ring" scanner to scan the item to confirm the pick rather than speaking the confirmation as traditional voice systems operate. The retail store server may relay whether the scanned item is correct or incorrect via speech through the earphone. In response to determining the pick is incorrect, the retail server may identify the mistake and prompt the personal shopper to the pick the correct item. In response to determining the picked item was correct the personal shopper may be directed by an illuminating light on top of a grid within customized cart. The customized cart may look very similar to cart that others shoppers use, again to minimize the impact of in store personal shoppers disrupting in-store customers. In an embodiment, a grid in the customized cart may be sized to support several bags within individual cubbies. The cubbies may have a light that will illuminate on one of the edges of the frame work that may indicate the location to which the item must be placed. In the case of more than one quantity of the same item for the same or multiple orders, the personal shopper may be required to scan each item and each scan may result in the appropriate light to be illuminated whether it is the same location of the previous item or a new location due to either order sizing exceeding the bag volume or to fulfill a separate order. The customized cart may also have scales, such as below the bags to confirm the placement of the item, or hanging scales that suspend a bag. The weight may verify that either an item has been placed in the bag or the exact weight of the item was put in the bag as a checksum.

Once the personal shopper has completed the route/order, the retail store server may send a picking complete message to the personal shopper who may transport the completed picks/bags to staging locations within a customer pickup location within a retail store. A portable receipt type printer could be located on the cart or at the station. Once triggered by a barcode or RFID flag, the printer may print a receipt for each bag showing the order number, contents, and customer identification as well as signify the put location of the order ready for pickup. The personal shopper may then affix the "ticket" onto the bag as a record and verification.

In an embodiment, the central server or retail store server may "cube" the orders to ensure that the appropriate number of items within a pick order do not overflow any one bag. In the various embodiments, the central server or retail store server, unlike a distribution center, may also segregate picks into proper locations within the cart to group similar items as a normal shopper or bagger would separate the items, such as by item type. For example, steaks, pork, and chicken may be assigned to one bag, ice cream and frozen waffles to another bag, and bread and potato chips to a third bag.

In an embodiment, a voice directed picking system in a retail store may enable customers physically shopping in the store to be audibly assisted in locating items. A customer, such as a foreign visitor who may unfamiliar with the store and/or language used in the store, may be given a personal shopper system, such as a headset connected to the retail store server. The customer may speak the name of an item into the headset microphone in his or her native language and the retail store server may identify the location of the item and output its location (e.g., aisle and directions from the customer's current location to the location of the item) in the customer's native language via the headset speaker. In this manner, the customer may be directed to the location of the item without the need for multilingual staff and/or multilingual signage to be present in the retail store.

The various embodiment voice ordering systems and/or voice directed picking systems may apply various language processing techniques to identify voice inputs received from customers and/or personal shoppers, including stored word libraries, natural language processing, etc. The various embodiment voice ordering systems and/or voice directed picking systems may include word libraries based on the intended user, such that a library for an experienced personal shopper may be different than the word library used for customers.

Inventory data available in a retail store may lag behind the actual current state of the items on the store shelves because customers physically shopping in the retail store may have placed items in their cart but not yet rung the item through a register in the retail store. In an embodiment, an order may be buffered to account for a lag in inventory data in the store. For example, when an order is received at the central server and/or retail store server, the quantity of an item requested in the order may be compared to the inventory data for that item in the store. Each item may be associated with a time based sales estimate, such as an average hourly sales rate based on past sales history for the item. The central server and/or retail store server may utilize a time stamp indicating the time of the inventory data and the time based sales estimate to decrement the inventory data to determine an estimated current on shelf inventory for the item. The central server and/or retail store server may compare the estimated current on shelf inventory for the item to the requested quantity of the item to determine whether the quantity request may be filled. In response to determining the quantity may be filled, the central server and/or retail store server may direct a personal shopper to pick the requested quantity of the item. In response to determining the quantity may not be filled, the central server and/or retail store server may indicate the item is unavailable. In this manner, the estimated current on shelf inventory for the item accounting for time based sales estimates may act as a buffer accounting for potential in-store shoppers. In an embodiment, when the personal shoppers are working after-hours in a retail store, the buffer may not be applied because customers may not be physically shopping in the store.

In an embodiment, a personal shopper system may include a customized cart configured to be used in conjunction with in-store order fulfillment. The customized cart may include a processor connected to various other devices including, memories, network interfaces, barcode scanners, cameras, scales, GPS receivers, displays, microphones, speakers, etc. In an embodiment, the customized cart may identify items as the items are placed in the cart, for example using item weight, a barcode scanner, and/or a camera. In an embodiment, the customized cart may establish a network connection (e.g., a Wi-Fi® connection, cellular connection, Bluetooth®, etc.) with a retail store server and may exchange data with the retail store server, such as an indication of the item(s) added to the customized cart. In an embodiment, the customized cart may determine its location in the retail store and may provide an indication of its current location to the retail store server. As examples, the customized cart may determine its location based on GPS information, based on markings on the retail store floor imaged with a camera, based on in store signal (e.g., audio signals, radio signals, light signals, etc.) measurements (e.g., via trilateration, etc.). In an embodiment, the customized cart may include a display for outputting information.

FIG. 1 illustrates a network system 100 suitable for use with the various embodiments. The network system 100 may include multiple devices, such as a computing device 102 (e.g., a mobile device, such as a smart phone), a central server 124, a warehouse server 120, a retail store server 108, and a personal shopper system 114. The computing device 102, central server 124, warehouse server 120, and retail store server 108 may be connected to the Internet 105 via wired and/or wireless connections. In this manner, via the connections to the Internet 105 the computing device 102, central server 124, warehouse server 120, and/or retail store server 108 may exchange data. In an embodiment, the central server 124 may include an order management system, such as a voice ordering system and/or web based ordering system, configured to receive orders from the computing device 102 and/or retail store server 108 and send orders for fulfillment to the retail store server 108 and/or warehouse server 120. The warehouse server 120 may be located in a warehouse 118 and may control material handling equipment 122, such as one or more conveyor, to fill orders, such as replenishment orders destined for the retail store 106. The retail store server 108 may be located in the retail store 106 and may be connected to one or more wireless transceivers or base stations 110 for establishing wireless connections with the personal shopper system 114 worn by a personal shopper 116 within the retail store 106. The personal shopper 116 may be an employee of the retail store 106 or may be a customer shopping in the retail store 106. In an embodiment, a local delivery truck 123 may connect to the Internet 105, for example via a computing device, such as a smart phone, used by the driver of the local delivery truck 123. In this manner, the local delivery truck 123 may exchange data with the retails store server 108, warehouse server 120, central server 124, and/or computing device 102.

In an embodiment, the personal shopper system 114 may comprise a headset including a microphone and speaker configured to be worn by the personal shopper 116, to provide voice outputs to the personal shopper 116, and to receive voice inputs from the personal shopper 116. For example, the personal shopper system may include a microphone and speaker in a discrete ear piece and microphone configuration. In a further embodiment, the personal shopper system 114 may also include goggles, glasses, or other ocular display devices ("goggles") 115 configured to be worn by the personal shopper 116 and to display information visually to the personal shopper 116. In an embodiment, the personal shopper system 114 may also include a customized cart 113 and/or a scanner 112. The customized cart 113 may be a cart configured to identify items as the items are placed in the customized cart 113. The scanner 112 may be a barcode scanner including a display configured to scan items and display information to the personal shopper 116. In an embodiment, the scanner 112 may be integrated into the customized cart 113. In another embodiment, the customized cart 113 and scanner 112 may be separate devices. The personal shopper system 114 through transceivers in the headset, goggles 115, cart 113, and/or scanner 112 may establish connections with the transceiver or base station 110 and the retail store server 108. In this manner, the personal shopper system 114 and retail store server 108 may exchange data.

As an example operation of the system 100, a customer using the computing device 102 may place an order with the central server 124 or directly with the retail store server 108. For example, the customer may place a call to the central server 124 while driving a vehicle to place a voice order for pickup for grocery items and the central server 124 may receive the order and pass the order to the retail store server 108 for fulfillment. The ability to call in orders via voice ordering may be advantageous to customers unable to use a website for ordering, such as customers driving. However, website based orders may also be received by the central server 124 or retail store server 108. Once the retail store server 108 receives the order (from the central server 124 or directly from the computing device 102), the retail store server 108 may send indications of the items to be picked for the order to the personal shopper system 114 worn by the personal shopper 116. These indications may be voice commands output by the headset, visual commands output by the goggles 115, displayed commands output by the display of the scanner 112 or customized cart 113, etc. The personal shopper 116 may confirm the picking of items via inputs to personal shopper system 114, such as via voice inputs to the microphone of the headset, eye or head movements to the goggles 115, scanning the items with the scanner 112, placing the items in the customized cart 113, etc., which may be transmitted to the retail store server 108. The personal shopper 116 may stage the picked items for pickup by the customer at the retail store 106 or for delivery by the local delivery truck 123. The retail store server 108 and/or central server 124 may generate replenishment orders and send the replenishment orders to the warehouse server 120 to replenish the retail store inventory used to fill the customer orders.

FIGS. 2A-2E are a process flow diagram illustrating an embodiment method for in store order fulfillment via voice directed picking. In block 202 (FIG. 2A) a customer's mobile device may call a voice ordering system hosted by a central server in response to the customer's input to initiate the call. In block 204 the mobile device may send the voice input received from the customer of one or more ordered items and quantities to the central server. In block 206 the central server may identify the customer and apply the customer brand preferences to generate the order. In an embodiment, the central server may identify the customer based on the customer's voice signature. In another embodiment, the central server may identify the customer based on data provided by the customer, such as a customer ID number. In an embodiment, brand preferences may be brands of items, such as a specific brand of beer or milk, that the customer prefers. In this manner, the voice inputs of the customer may be general, such as "beer" and the central server may apply the brand preference to generate the order for "Budweiser®". In an embodiment, the voice inputs from the customer may be received in various languages, and the central server may select a language from a series of available languages with which to translate the customer's order. In block 208 the central server may select a retail store to fill the order. In an embodiment, the retail store to fill the order may be a preference or setting associated with the customer's account, such as a preferred store. In another embodiment, the retail store to fill the order may be a store selected as closest to the customer's address.

In block 210 (FIG. 2B) the central server may request retail store inventory data from the retail store server of the selected retail store. In block 212 the retail store server may send inventory data. In block 214 the central server may determine fillable items for the order. Fillable items may be items for which there may be sufficient inventory at the retail store to meet the ordered quantities. In an embodiment, the central server may apply a buffer to account for items that may be already placed in customer carts physically shopping in the store but not yet checked out, as discussed above. In block 216 the central server may send an order confirmation indicating the fillable items and delivery or pickup information to the customer's mobile device. In an embodiment, a customer may select a preference for delivery or in store pick up for his or her order. In block 218 the central server may send the order and customer information to the retail store server of the retail store. In an embodiment, the customer information may include identifying information for the customer placing the order, such as an image of the customer, address, billing information, preferences, etc., that may enable a personal shopper in the retail store to identify the customer.

In optional block 220 (FIG. 2C) the central server may send a replenishment order to the warehouse server to enable the warehouse server to generate a replenishment shipment for the retail store in block 224. As examples, blocks 220 and 224 may be optional because the central server may not replenish the retail store after every order and/or because the retail store server may handle replenishment operations. In block 226 the retail store server may select a personal shopper to pick items for the order and place the items in a carton. In an embodiment, the retail store server may select a personal shopper based at least in part on the current customer load of the retail store, performance metrics for personal shoppers, or other labor management information. In block 228 the retail store server may send a request for the personal shopper current location to the personal shopper system worn by the personal shopper. In block 230 the personal shopper system worn by the personal shopper may send a location indication to the retail store server. In various embodiments, the personal shopper system may determine the location in the retail store based on GPS coordinates, signal triangulation or trilateration, RFID tags in the store, light sensor measurement of different lights in the store, floor marker or other fixture marker imaging (such as marks on the store aisle floors), or by indicating the location of the last item scanned by the personal shopper system.

In block 234 (FIG. 2D) the retail store server may select item locations to pick from to fill the order (or cart) and sort the items in the order (or cart) based on picking efficiency from the current personal shopper location. For example, based on the selected personal shopper being in aisle number four the retail store server may sort the items to be picked from aisle four such that travel distance for the personal shopper may be minimized. In this manner, a personal shopper in aisle four assigned to an order may be given a sorted cart (or order) having different picking order than a personal shopper in aisle six assigned to the same order because the personal shoppers started in different locations. In block 236 the retail store server may send the sorted cart (or order) to the personal shopper system. In an embodiment, the entire sorted order may be sent at once to the personal shopper system. In another embodiment, the retail store server may send the order one item at a time to the personal shopper system. In block 238 the personal shopper system may generate cues for each item. In an embodiment, the cues may be voice indications of the items, the quantity to pick, and the item locations. In an embodiment, the item locations may be exact locations, for example identifying the specific aisle, aisle side, shelf, and position of the items. In another embodiment, the item locations may be approximate locations, for example identifying only the aisle and aisle side. In an embodiment, the cues for the personal shopper may be generated in a language specific to that personal shopper selected from a series of available languages. In block 240 the personal shopper system may send indications of the items as each item is picked to the retail store server. In an embodiment, the indications of the items may be voice confirmations of the item from the personal shopper. In other embodiments, the indications may be signals from a customized cart that the item was placed in the cart, signals from a barcode scanner, RFID indications received from a shelving unit indicating a personal shopper removed an item or reached his or her hand into a location, etc. In block 242 the retail store server may send an indication of the staging location to the personal shopper system. The staging location may be a location designated for in store pickup by the customer or a local delivery truck for delivery of the order to the customer.

In block 244 (FIG. 2E) the personal shopper system may send an indication of the carton or order being staged to the retail store server. In optional block 246 the retail store server may assign a delivery truck to deliver the order. Block 246 may be optional because not all orders may be delivery type orders. In block 248 the retail store server may send customer information to the personal shopper system. The customer information may be information enabling the personal shopper or driver of the delivery truck to identify the customer, such as a delivery address, an image, etc. In optional blocks 250 or 252 the personal shopper system or delivery truck, respectively, may send a delivery indication to the retail store server. A personal shopper may send a delivery indication via a voice input via his or her personal shopper system, while a delivery driver may indicate delivery by calling the retail store server via his or her mobile device, such as a smart phone. In optional block 254 the retail store server may indicate delivery to the central server, and in optional blocks 256 or 258 the retail store server or central server may charge the customer for the order. Blocks 256 or 258 may be optional because charging may occur at other points in the method or may be handled by other devices.

Figure 3:
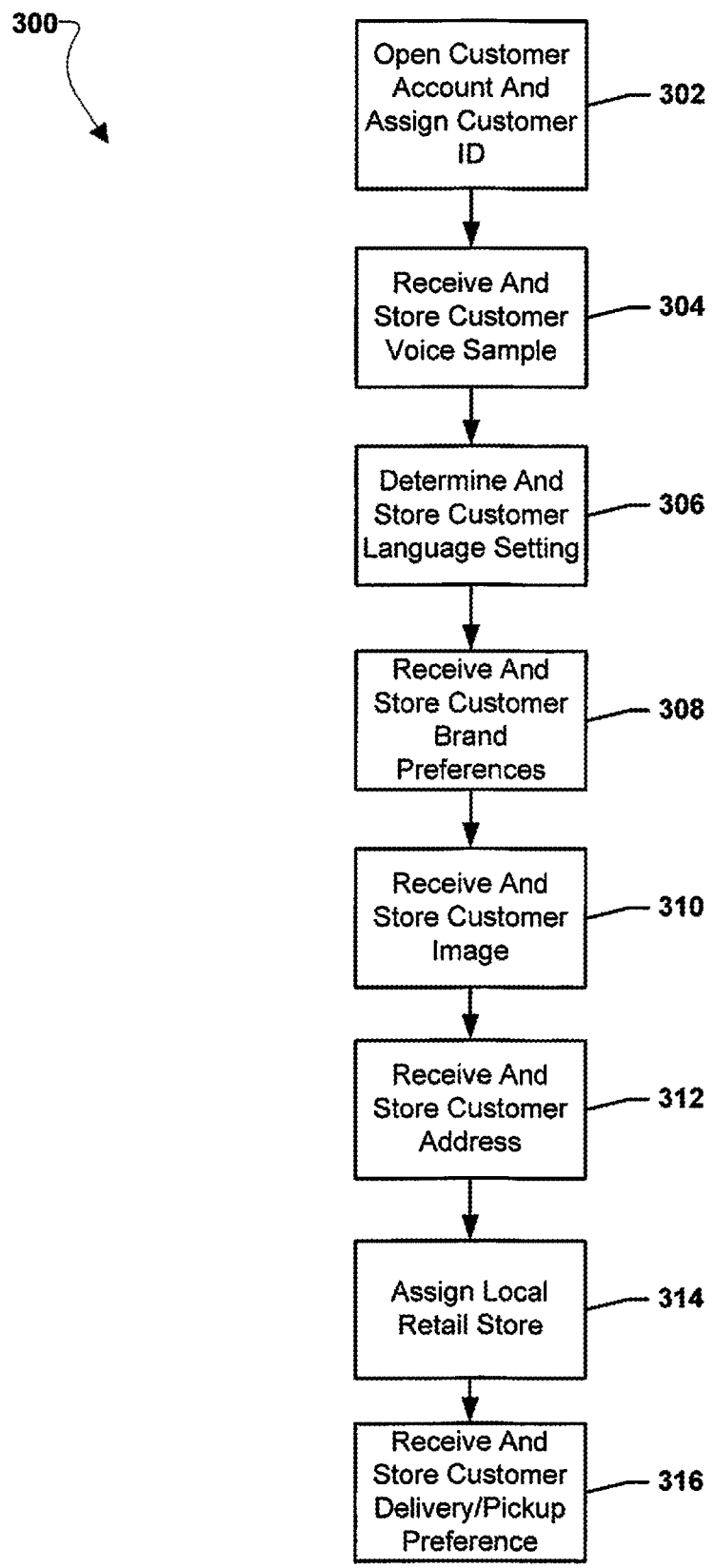
FIG. 3 is a process flow diagram illustrating an embodiment method for establishing a customer account.
Figure 4A:
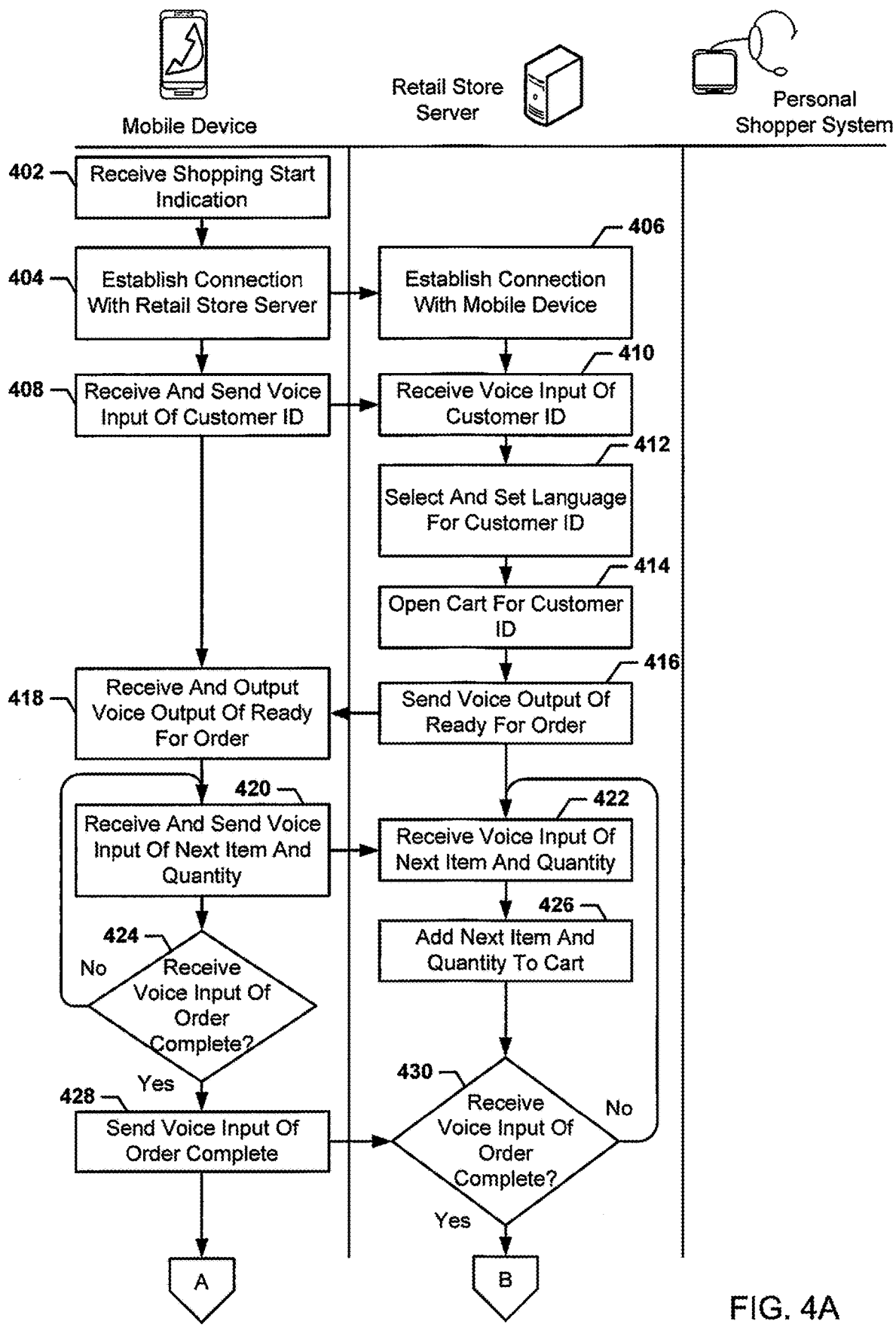
FIGS. 4A-4D are a process flow diagram illustrating another embodiment method for in store order fulfillment via voice directed picking.
Figure 4B:
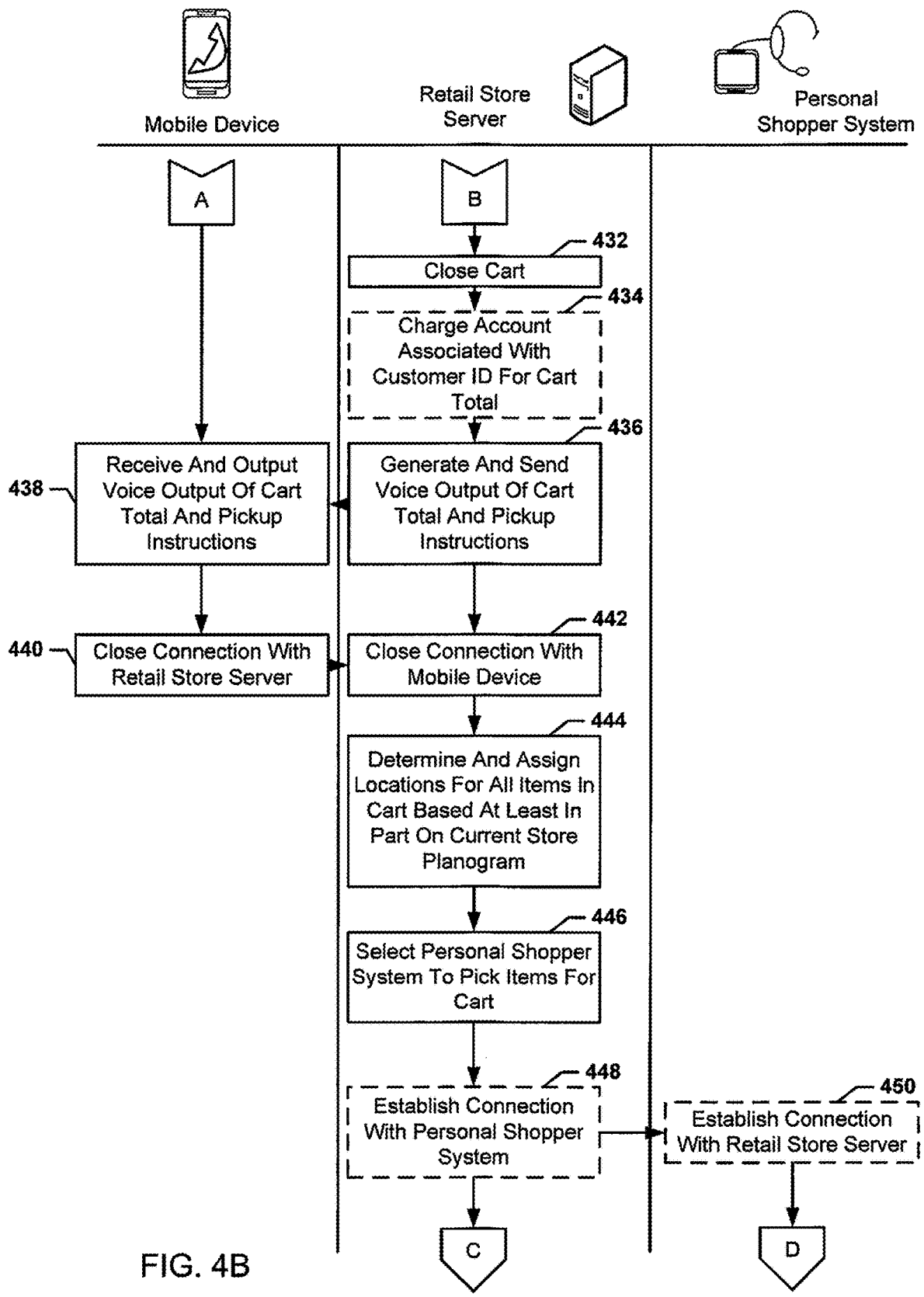
Figure 4C:
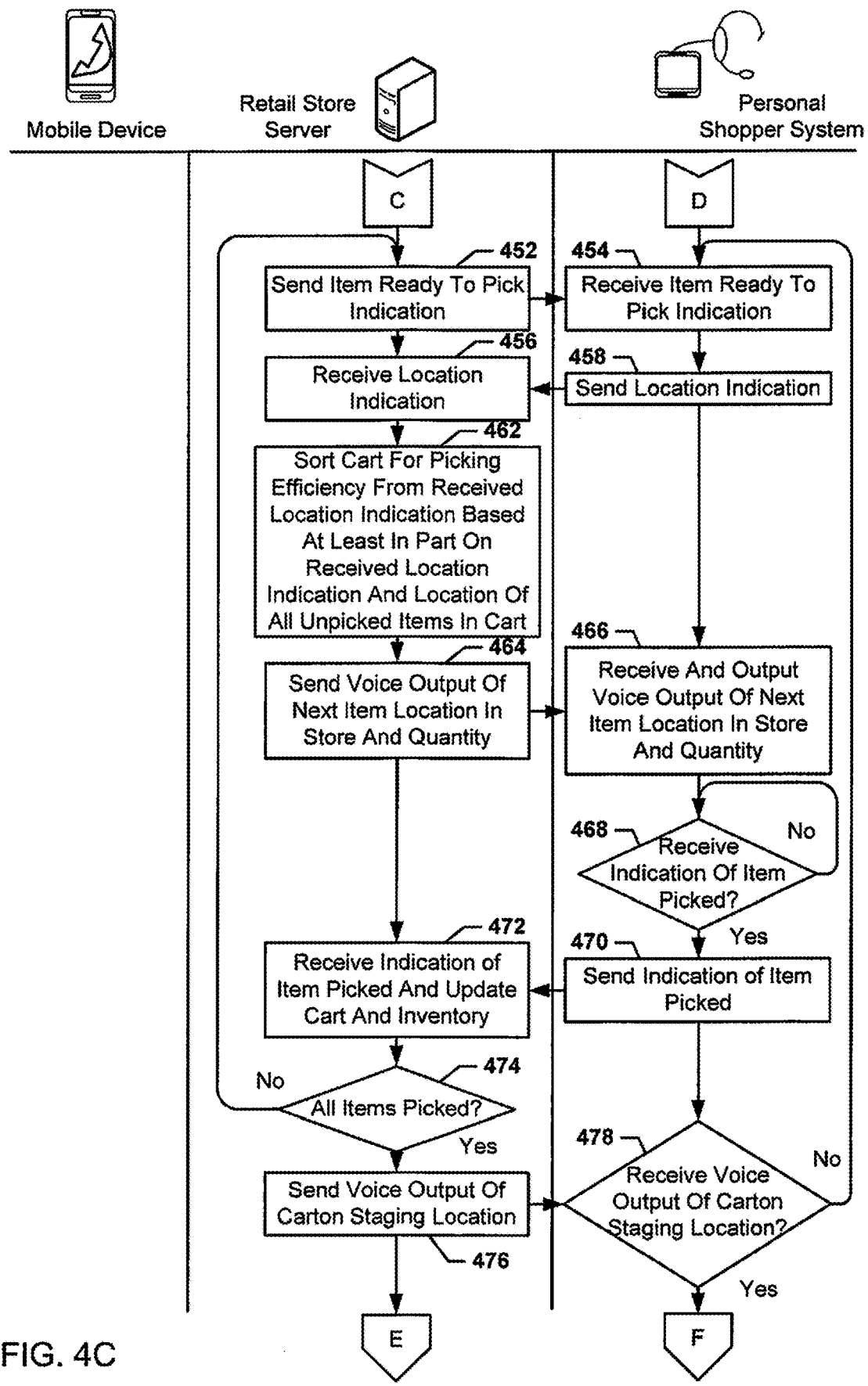
Figure 4D:
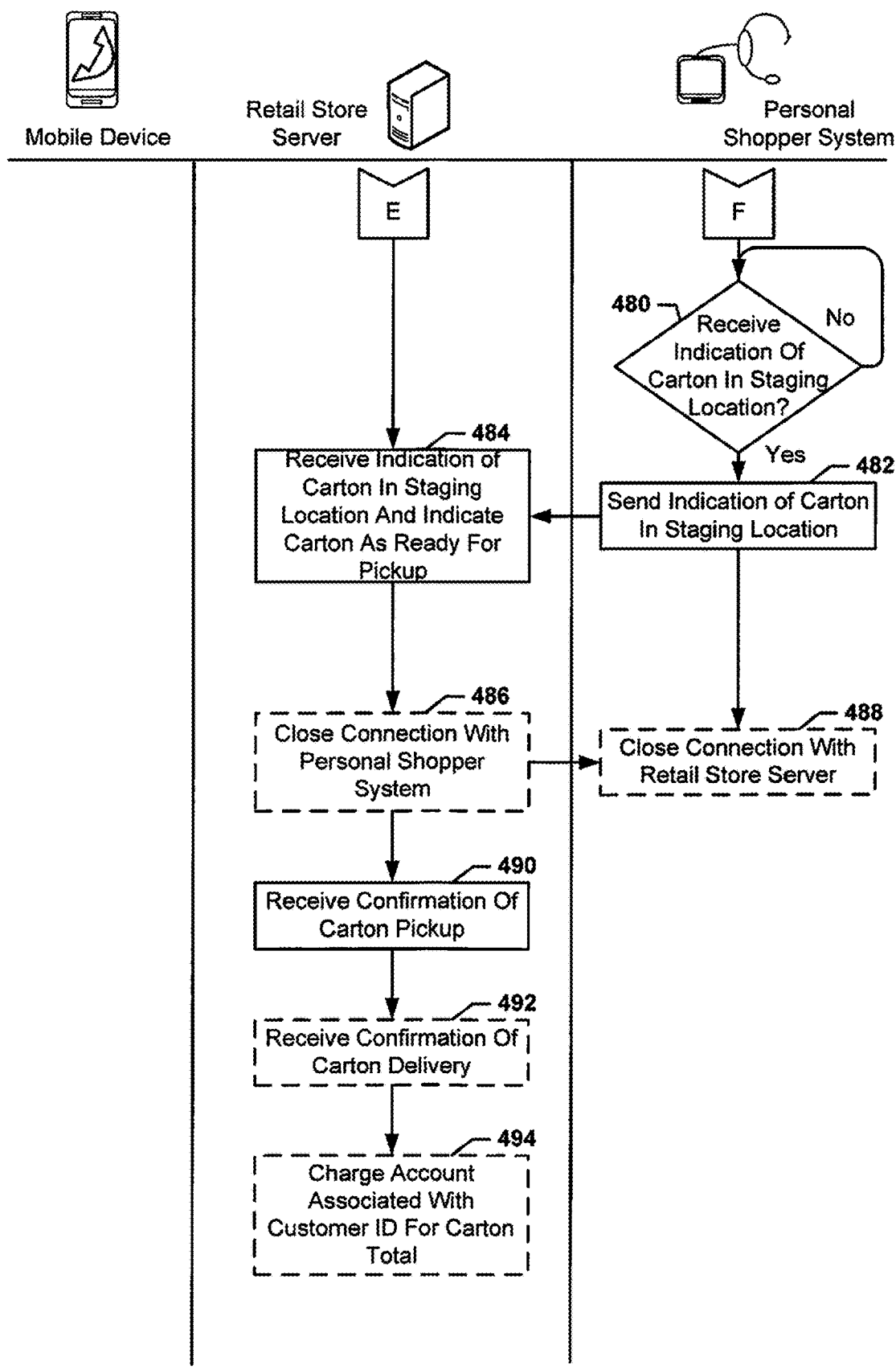

FIG. 3 illustrates an embodiment method 300 for establishing a customer account. In an embodiment, the operations of method 300 may be performed by a central server and/or a retail store server in response to inputs from a customer, such as voice inputs or inputs via a web portal. In block 302 the server may open a customer account and assign a customer ID to the customer account. In block 304 the server may receive and store a customer voice sample. The customer voice sample may enable the server to develop a voice signature for the customer. In block 306 the server may determine and store a customer language setting for the customer. In an embodiment, more than one language may be used to place orders by customers and the customer language setting may enable the customer's inputs to be translated into orders and may enable voice outputs to the customer to be made in the customer's native language. In block 308 the server may receive and store customer brand preferences. In block 310 the server may receive and store a customer image. In block 312 the server may receive and store a customer address. In block 314 the server may assign a local retail store for the customer. In an embodiment, the local retail store may be the default store for filling orders for the customer and may be selected based on its proximity to the customer's address. In block 316 the server may receive and store a customer delivery or pickup preference. In this manner, customers may indicate whether they prefer in store pick up or delivery of their ordered items.

FIGS. 4A-4D are a process flow diagram illustrating another embodiment method for in store order fulfillment via voice directed picking similar to methods described above. In block 402 (FIG. 4A) the customers mobile device may receive a start shopping indication, such as a call placed to the voice ordering system hosted by a retail store server. In block 404 and block 406 the mobile device and retail store server may establish a connection with one another. In block 408 the mobile device may receive and send voice inputs from the customer using the mobile device of the customer's ID and send the customer ID to the retail store server. The retail store server may receive the voice input of the customer ID in block 410 and in block 412 the retail store server may select and set a language for the customer ID. The language may be selected based on customer preferences and/or identified based on the voice input from the customer. In block 414 the retail store server may open a cart of the customer ID and in block 416 send a voice output of ready for order to the mobile device.

In block 418 the mobile device may receive and output the read for order voice output. In block 420 the mobile device may receive and send a voice input of the next item and quantity to the retail store server. In block 422 the retail store server may receive the voice input of the next item and quantity and in block 426 add the next item and quantity to the cart. In determination block 424 the mobile device may determine whether the voice input of order complete is received and in response to determining the order is not complete (i.e., determination block 424="No"), may continue to receive and send voice inputs in block 420. In block 430 the retails store server may determine whether a voice input for an order complete is received and in response to determining the order is not complete (i.e., determination block 430="No"), may continue to receive voice inputs in block 422.

In response to determining the order is complete (i.e., determination block 424="Yes"), in block 428 the mobile device may send a voice input of the order complete to the retail store server and in response to receiving the voice input of the order complete (i.e., determination block 430="Yes"), in block 432 (FIG. 4B) the retails store server may close the cart in block 432. In optional block 434 the retails store server may charge the account associated with the customer ID for the cart total value. In block 436 the retail store server may generate and send a voice output of the cart total and pickup instructions (or delivery instructions), and in block 438 the mobile device may receive the voice output of the cart total and pickup or delivery instructions. In blocks 440 and 442 the mobile device and retail store server may close the connections with one another.

In block 444 the retail store server may determine and assign location for all items in the cart based at least in part on the current store planogram. In block 446 the retail store server may select a personal shopper system to pick items for the cart. In optional blocks 448 and 450 the retail store server and personal shopper system of the selected personal shopper may establish connections with one another. In another embodiment, blocks 448 and 450 may be optional because the retail store server and personal shopper systems may be always connected. In block 452 the retail store server may send an item ready to pick indication and in block 454 the personal shopper system may receive the item ready to pick indication. In block 458 the personal shopper system may send a location indication as discussed above and in block 456 the retail store server may receive the location indication. In block 462 the retail store server may sort the cart for picking efficiency from the received location indication based at least in part on the received location indication and location of all unpicked items in the cart. In this manner, the cart may be sorted based on the current location of the personal shopper wearing the personal shopper system.

In block 464 the retail store server may send a voice output of the next item location in the store and quantity to the personal shopper system which may receive and output the voice output to the personal shopper in block 466. In determination block 468 the personal shopper system may determine whether an indication of the item being picked is received. In response to determining no pick indication is received (i.e., determination block 468="No"), the personal shopper system may continue to monitor for the pick indication in block 468. In response to receiving a pick indication (i.e., determination block 468="Yes"), in block 470 the personal shopper system may send the indication of the item picked to the retail store server and the retail store server may receive the item pick indication and update the cart and inventory of the retail store accordingly. In an embodiment, the indication of the item picked may be a voice indication, barcode scan indication, RFID indication, weight scale indication, item image, etc. In determination block 474 the retail store server may determine whether all items for the cart are picked, and in response to determining all items are not picked (i.e., determination block 474="No"), send another item ready to pick indication in block 452.

In response to determining all items are picked (i.e., determination block 474="Yes"), in block 476 the retail store server may send a voice output of the carton staging location. In determination block 478 the personal shopper system may determine whether a voice output of a carton staging location is received. In response to determining the voice output of the carton staging location is not received (i.e., determination block 478="No"), the personal shopper system may receive another item ready to pick indication in block 454. In response to determining the voice output of the carton staging location is received (i.e., determination block 478="Yes"), in determination block 480 (FIG. 4D) the personal shopper system may determine whether an indication of the carton in the staging location is received. In response to determining the carton is not in the staging area (i.e., determination block 480="No"), the personal shopper system may continue to monitory for the carton being indicated in the staging area in block 480. In response to determining the carton is in the staging area (i.e., determination block 480="Yes"), in block 482 the personal shopper system may send an indication of the carton in the staging location to the retail store server and in block 484 the retail store server may receive the indication of the carton in the staging area and indicate the carton is ready for pickup. In optional blocks 486 and 488 the retail store server and personal shopper system may close the connections with one another. In block 490 the retail store server may receive confirmation of pickup of the carton. In optional block 492 the retail store server may receive confirmation of carton delivery by a local delivery truck. In optional block 494 the retail store server may charge the account associated with the customer ID for the carton total value.

Figure 5:
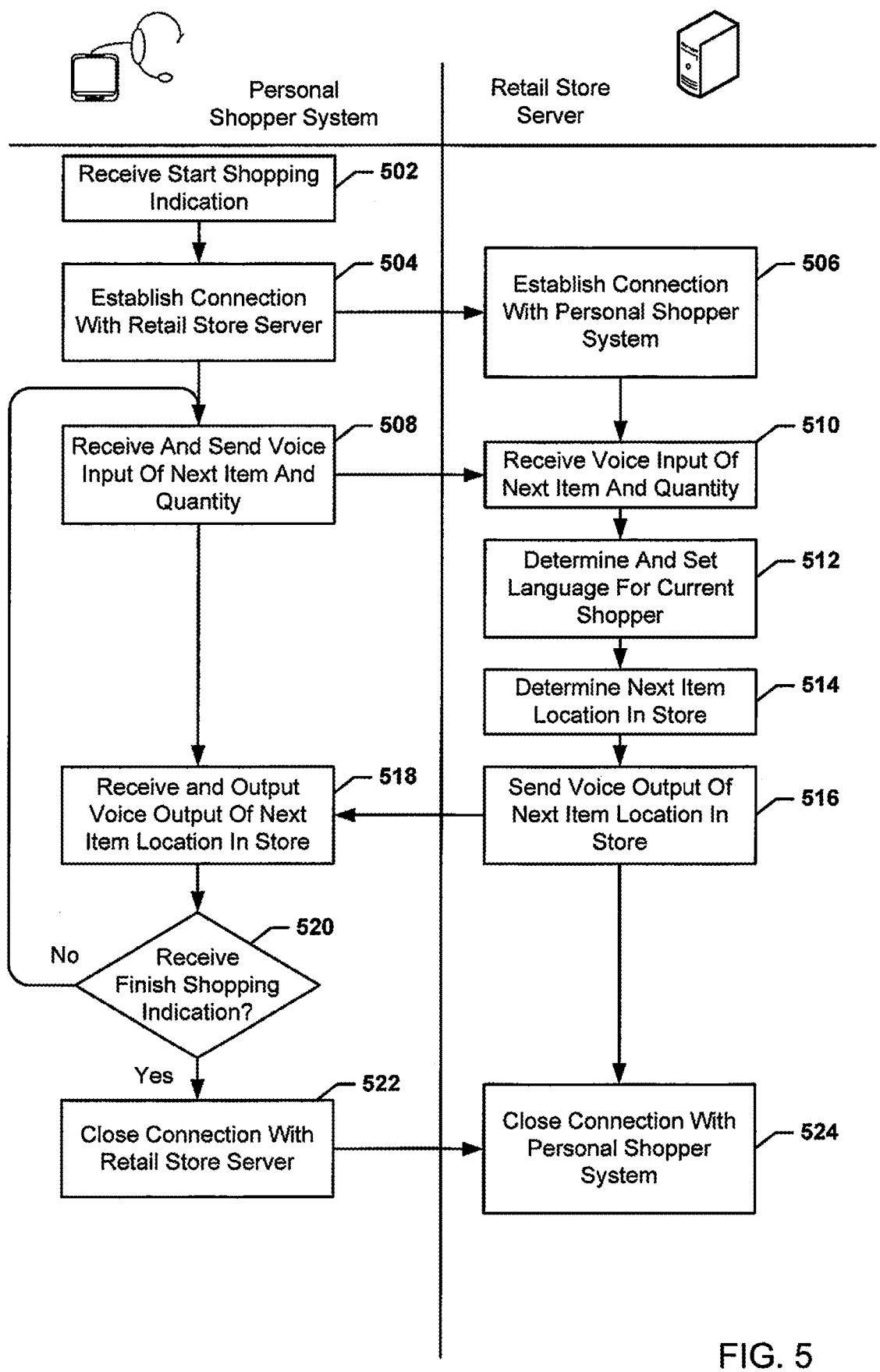
FIG. 5 is a process flow diagram illustrating an embodiment method for voice assisted shopping.

FIG. 5 is a process flow diagram illustrating an embodiment method for voice assisted shopping. In an embodiment, a personal shopper system may be given to a customer when the customer enters a retail store to assist the customer in finding items in the retail store. In block 502 the personal shopper system may receive a start shopping indication. For example, the start shopping indication may be an indication of a button press event or a spoken command by the customer. In blocks 504 and 506 the personal shopper system and retail store server may establish connections with one another. In block 508 the personal shopper system may receive a voice input of a next item and quantity from the customer and send the voice input to the retail store server. In block 510 the retail store server may receive the voice input of the next item and quantity.

In block 512 the retail store server may determine and set a language for the current shopper. For example, the retail store server may analyze the voice input to identify the language associated with the voice input and select that language for the current shopper from a series of available languages. In block 514 the retail store server may determine the next item location in the retail store. For example, the retail store server may identify the location associated with the item in a planogram of the store. In block 516 the retail store server may send a voice output of the next item location in the store in the selected language for the customer and in block 518 the personal shopper system may receive and output the voice output of the next item location in the retail store. In determination block 520 the personal shopper system may determine whether a finishing shopping indication is received. For example a finish shopping indication may be a button press event or spoken command. In response to not receiving a finish shopping indication (i.e., determination block 520="No"), in block 508 the personal shopper system may receive and send a voice input of the next item and quantity. In this manner, items may be continually located and their locations indicated to the customer as the customer shops in the retail store. In response to receiving a finish shopping indication (i.e., determination block 520="Yes"), in blocks 522 and 524 the personal shopper system and retail store server may close the connection with one another.

Figure 6:
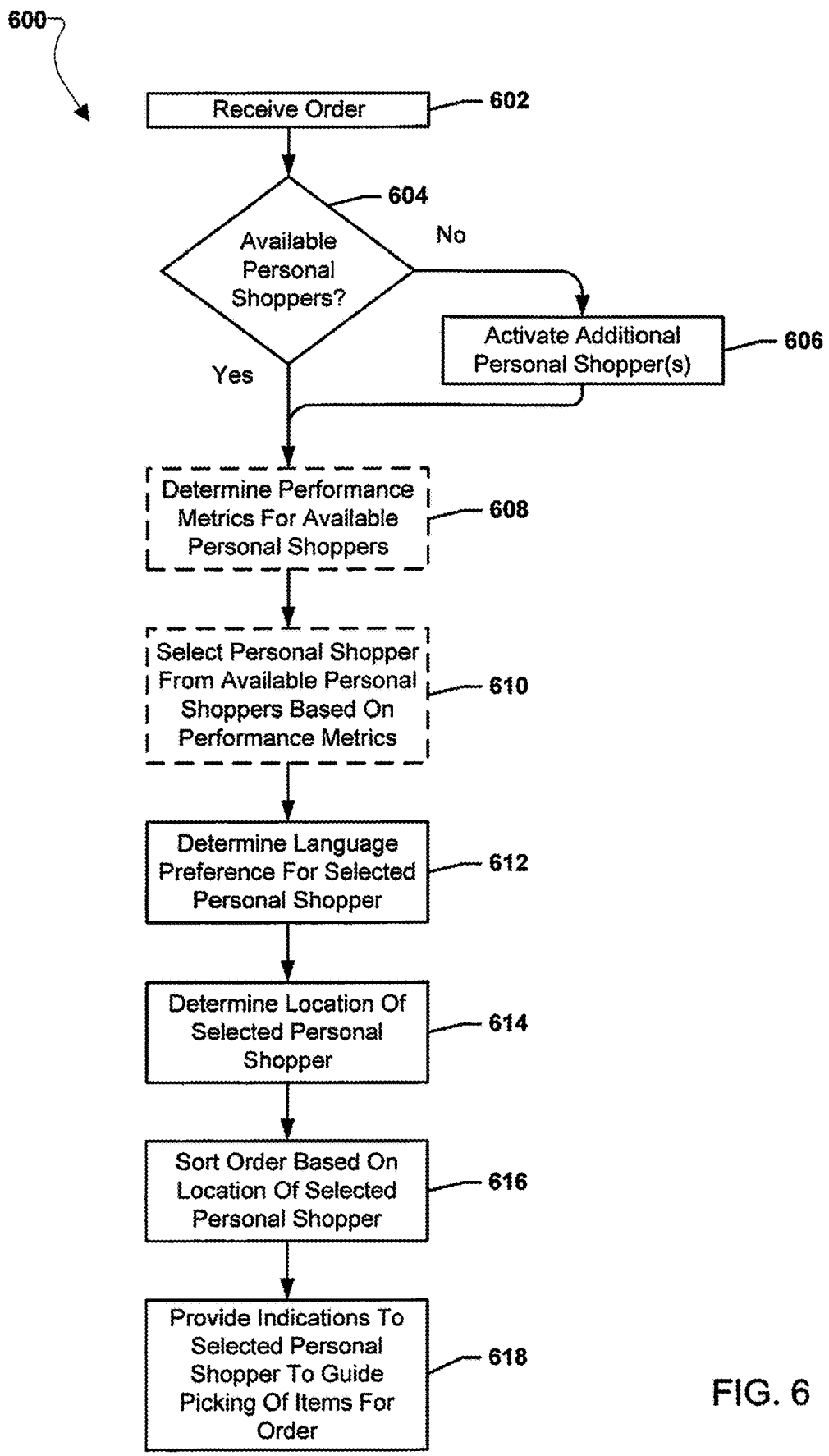
FIG. 6 is process flow diagram illustrating an embodiment method for selecting and directing a personal shopper in a retail store.

FIG. 6 is process flow diagram illustrating an embodiment method 600 for selecting and directing a personal shopper in a retail store. In an embodiment, the operations of method 600 may be performed by a retail store server. In block 602 the retail store server may receive the order. In an embodiment, the order may be received directly from a customer. In an embodiment, the order may be received via a central server. In determination block 604 the retail store server may determine whether there are any available personal shoppers. In an embodiment, available personal shoppers may be store employees currently assigned to picking orders from the retail store locations who are not currently assigned to picking an order. In response to determining there are no available personal shoppers (i.e., determination block 604="No"), in block 606 the retail store server may activate additional personal shoppers. In an embodiment, the retail store server may activate additional shoppers by sending an indication to an employee via the employee's personal shopper system directing the employee to change tasks to picking orders.

In response to determining personal shoppers are available (i.e., determination block 604="Yes") or upon activating personal shoppers in block 606, in optional block 608 the retail store server may determine a performance metric for the available personal shoppers. Performance metrics may include an average pick speed, hours worked, time until next break, etc. In optional block 610 the retail store server may select a personal shopper from the available personal shoppers based on the performance metrics. As examples a fastest picker may be selected or a least utilized employee. Blocks 608 and 610 may be optional because the retail store server may merely pick the next available personal shopper sequentially without any consideration of metrics.

In block 612 the retail store server may determine a language preference for a selected personal shopper. As an example, each personal shopper may be able to select his or her own native language in which to receive commands from a series of available languages. In block 614 the retail store server may determine the location of the selected personal shopper. As examples, the retail store server may determine the personal shopper location based in various manners including based on GPS information, camera imaging, barcode scanning, RFID tags, etc. as discussed above. In block 616 the retail store server may sort the order based on the location of the selected personal shopper. As discussed above, the retail store server may sort the order to guide the personal shopper through the retail store in an ergonomic/efficient manner. In block 618 the retail store server may provide indications to the selected personal shopper to guide the personal shopper in picking items for the sorted order.

Figure 7:
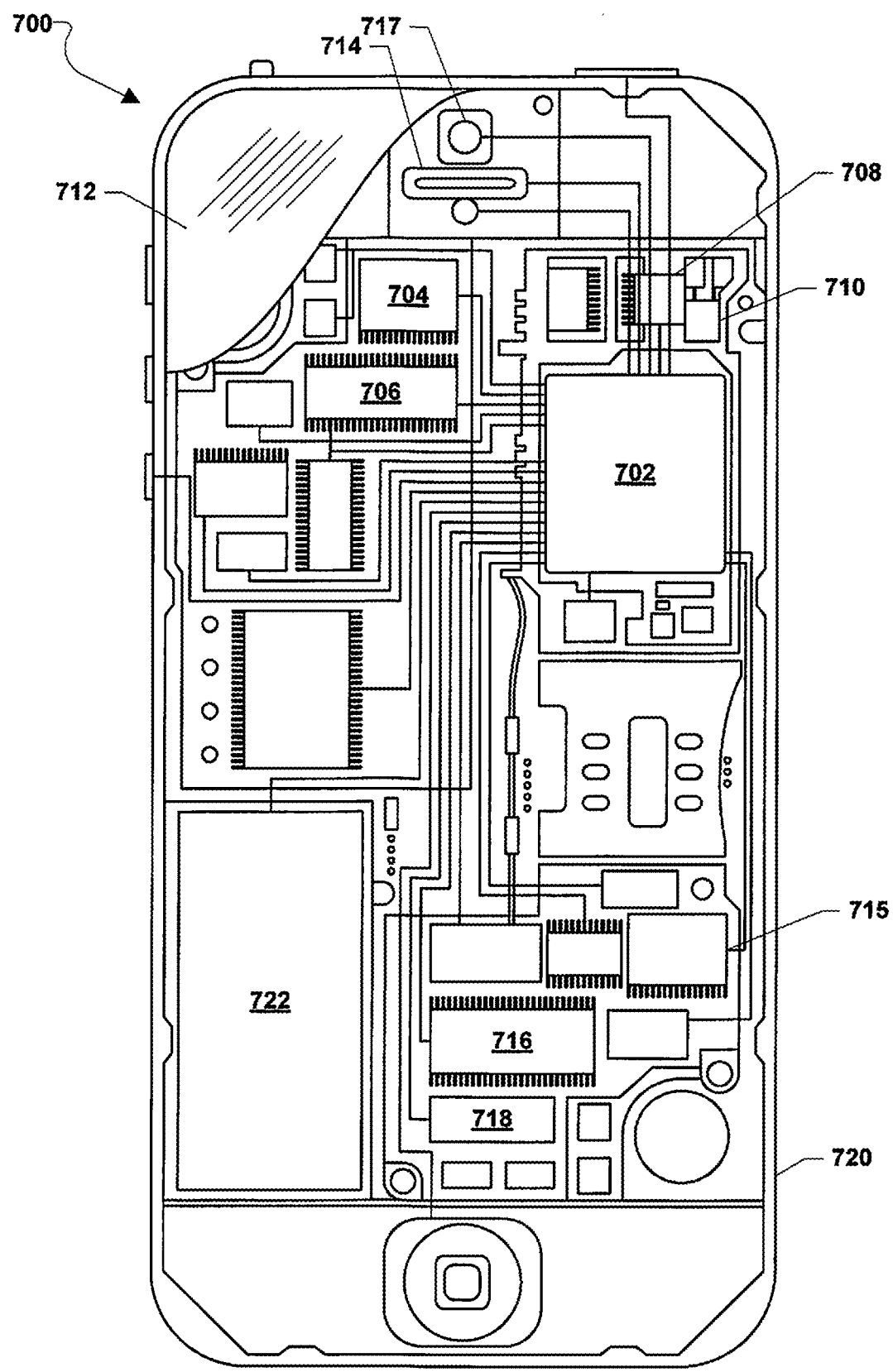
FIG. 7 is a component diagram of an example computing device suitable for use with the various embodiments.

The various embodiments may be implemented in any of a variety of computing devices, an example of which is illustrated in FIG. 7. For example, the computing device 700 may include a processor 702 coupled to internal memories 704 and 706. Internal memories 704 and 706 may be volatile or non-volatile memories, and may also be secure and/or encrypted memories, or unsecure and/or unencrypted memories, or any combination thereof. The processor 702 may also be coupled to a touch screen display 712, such as a resistive-sensing touch screen, capacitive-sensing touch screen infrared sensing touch screen, or the like. Additionally, the display of the computing device 700 need not have touch screen capability. The computing device 700 may have one or more radio signal transceivers 708 (e.g., Peanut®, Bluetooth®, Zigbee®, Wi-Fi, RF radio) and antennae 710, for sending and receiving, coupled to each other and/or to the processor 702. The computing device 700 may include a cellular network interface, such as wireless modem chip 716, that enables communication via a cellular data network (e.g., CDMA, TDMA, GSM, PCS, 3G, 4G, LTE, or any other type of cellular data network) and is coupled to the processor 702. The computing device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port. The computing device 700 may also include speakers 714 for providing audio outputs and microphones 715. The computing device 700 may also include a housing 720, constructed of a plastic, metal, or a combination of materials, for containing all or some of the components discussed herein. The computing device 700 may include a power source 722 coupled to the processor 702, such as a disposable or rechargeable battery. The rechargeable battery may also be coupled to the peripheral device connection port to receive a charging current from a source external to the computing device 700. The computing device 700 may also include one or more camera 717 or other imaging device, such as a scanner, connected to the processor 702.

Figure 8:
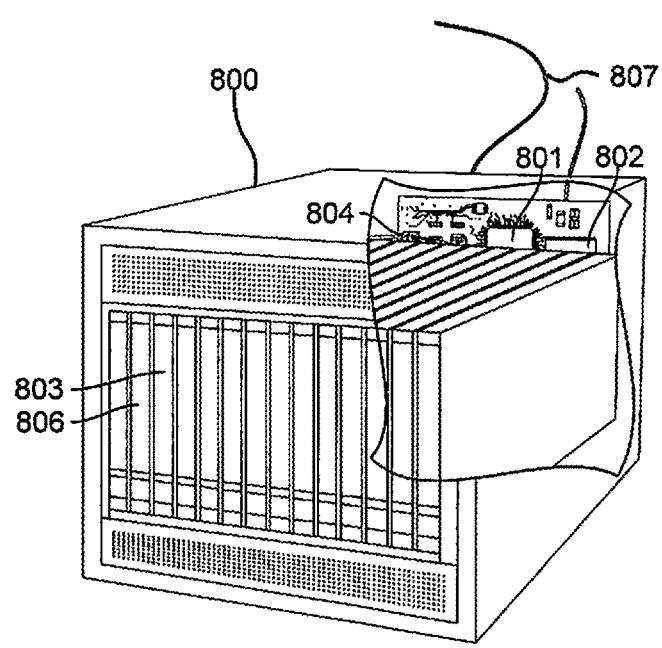
FIG. 8 is a component diagram of an example server suitable for use with the various embodiments.

The various embodiments may also be implemented on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 806 coupled to the processor 801. The server 800 may also include network access ports 804 coupled to the processor 801 for establishing network interface connections with a network 807, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 9:
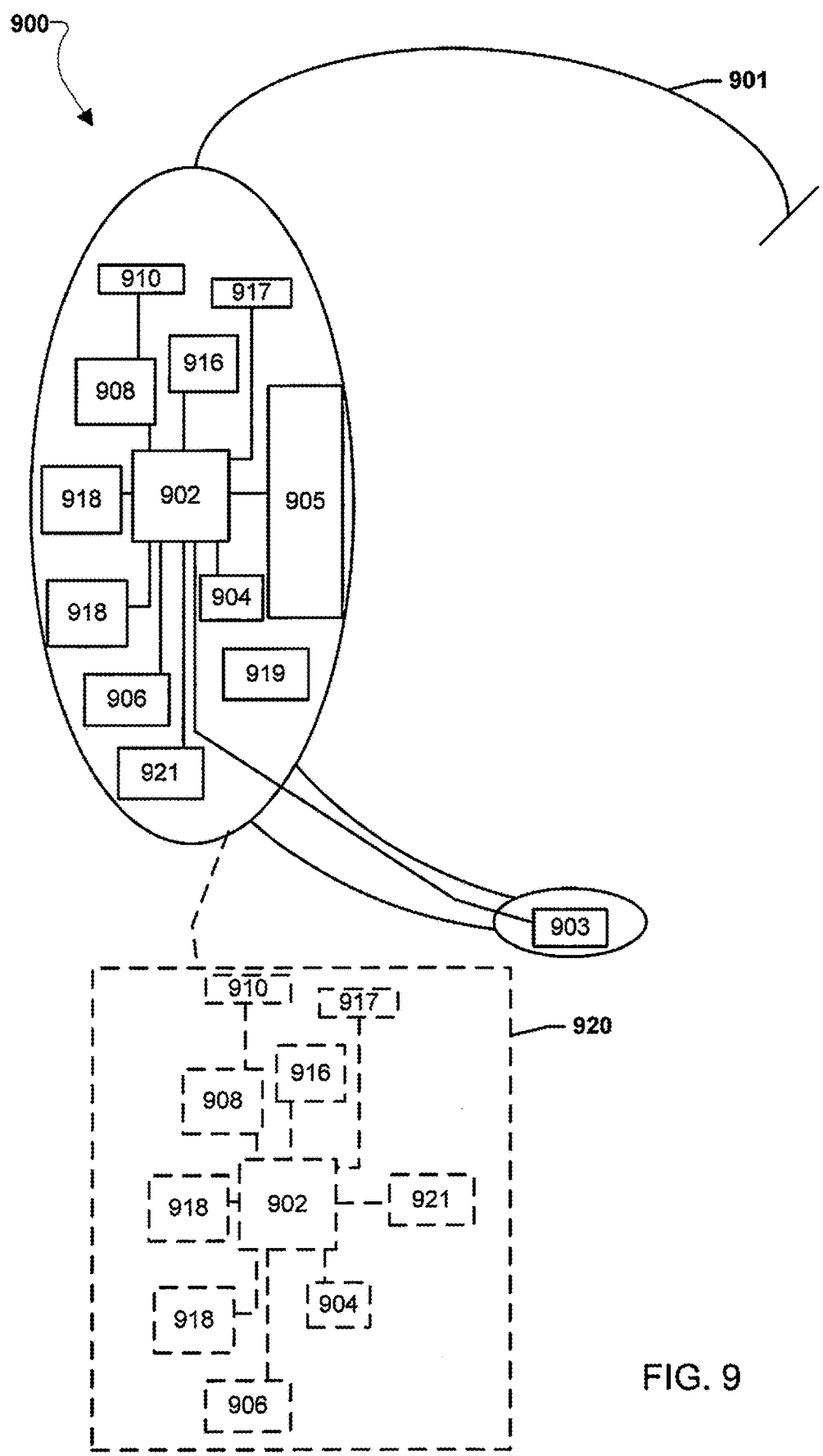
FIG. 9 is a component diagram of an example personal shopper system suitable for use with the various embodiments.

The various embodiments may also be implemented in any of a variety of personal shopper systems, such as personal shopper system 900 illustrated in FIG. 9. Personal shopper system 900 may include a headset 901 which may include a speaker 905 and microphone 903 connected to a processor 902. The processor 902 may be connected to internal memories 904 and 906. Internal memories 904 and 906 may be volatile or non-volatile memories. The personal shopper system 900 may have one or more radio signal transceivers 908 (e.g., Peanut®, Bluetooth®, Zigbee®, Wi-Fi, RF radio) and antennae 910, for sending and receiving, coupled to each other and/or to the processor 902. The personal shopper system 900 may include a cellular network interface, such as wireless modem chip 916, that enables communication via a cellular data network (e.g., CDMA, TDMA, GSM, PCS, 3G, 4G, LTE, or any other type of cellular data network) and is coupled to the processor 902. The personal shopper system 900 may also include a location sensor 917, such as a GPS receiver coupled to the processor 902. The personal shopper system 900 may also include one or more camera 918 or other imaging device, such as a scanner, connected to the processor 902. The personal shopper system 900 may include one or more RFID reader 921 connected to the processor 902. In an alternative embodiment, rather than being located in the headset 901, various pieces of hardware of the personal shopper system 900, such as the processor 902, memories 904, 906, transceivers 908, antennae 910, modem chip 916, location sensor 917, battery 919, and/or camera 918, may be located in a housing 920 connected to the headset 901 via a wired or wireless connection. For example, the housing 920 may be attached to a belt worn by the personal shopper. As another example, the housing 920 may be a computing device, such as a smart phone or tablet into which the headset 901 may be connected. In an embodiment, the personal shopper system 900 may also include one or more displays, such as goggles, lens, or other ocular display devices worn in front of a personal shoppers eyes or a display, such as a touch screen display incorporated into housing 920, connected to the processor 902 for outputting visual information to the personal shopper. While illustrated as a headset, the personal shopper system 900 may be configured in other manners, such as a discrete ear piece, etc.

Figure 10:
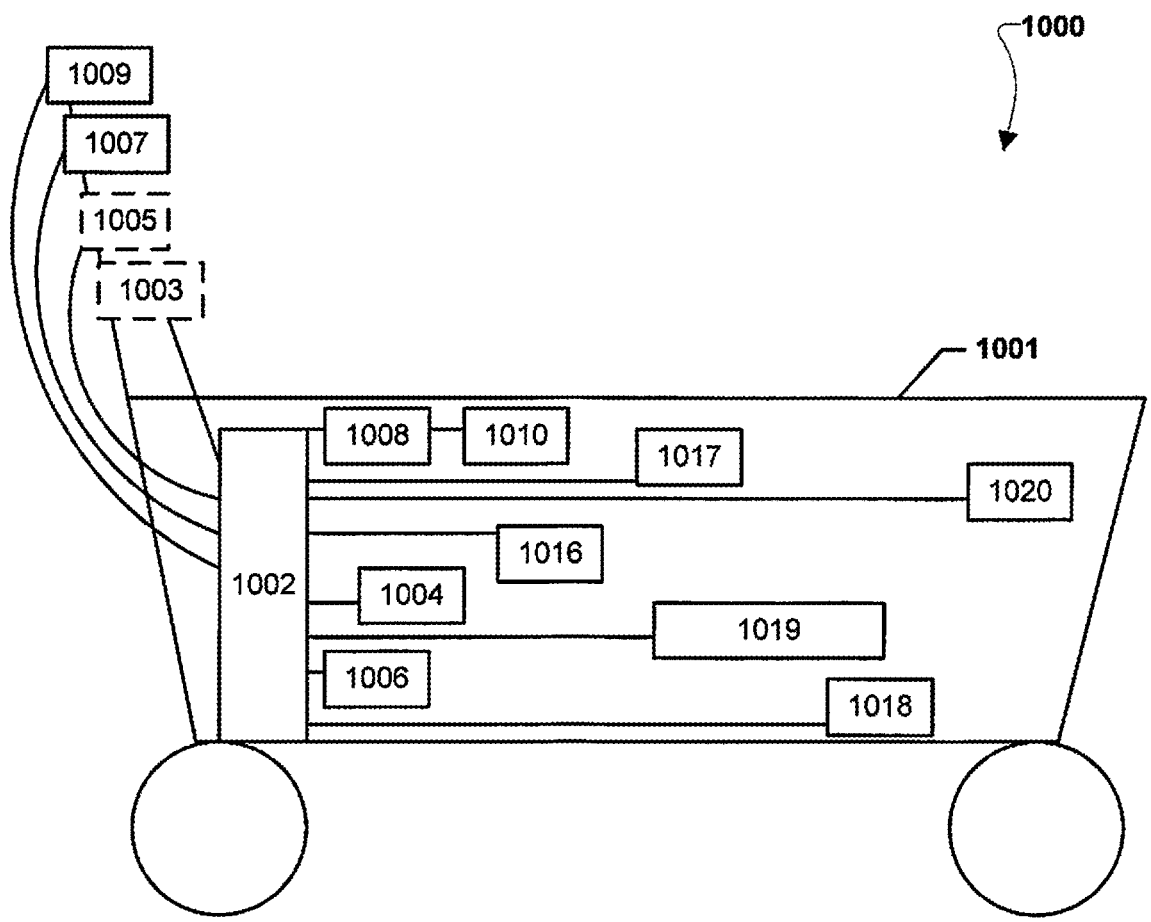
FIG. 10 is a component diagram of an example customized cart suitable for use with the various embodiments.

The various embodiments may also be implemented in any of a variety of customized carts, such as customized cart 1000 illustrated in FIG. 10. Customized cart 1000 may be a component of a personal shopper system and may operate in conjunction with the headsets or other computing devices utilized by a personal shopper described above. The customized cart 1000 may include a cart frame 1001 including a storage location for picked items and wheels to maneuver around a retail store. The customized cart 1000 and/or frame 1001 may also include cubbys and or other dividers to separate bags and or orders from one another. The customized cart 1000 may include an optional speaker 1005 and microphone 1003 connected to a processor 1002. The processor 1002 may be connected to internal memories 1004 and 1006. Internal memories 1004 and 1006 may be volatile or non-volatile memories. The customized cart 1000 may have one or more radio signal transceivers 1008 (e.g., Peanut®, Bluetooth®, Zigbee®, Wi-Fi, RF radio) and antennae 1010, for sending and receiving, coupled to each other and/or to the processor 1002. The customized cart 1000 may include a cellular network interface, such as wireless modem chip 1016, that enables communication via a cellular data network (e.g., CDMA, TDMA, GSM, PCS, 3G, 4G, LTE, or any other type of cellular data network) and is coupled to the processor 1002. The customized cart 1000 may also include a location sensor 1017, such as a GPS receiver coupled to the processor 1002. The customized cart 1000 may also include one or more camera 1018 or other imaging device, such as a scanner, connected to the processor 1002. The customized cart 1000 may include one or more load sensor 1019, such as a scale or other weight measurement device connected to the processor 1002. The customized cart 1000 may include one or more RFID reader 1020 connected to the processor 1002. The customized cart 1000 may also include one or more various lights and/or displays 1007 connected to the processor 1002 to indicate information about items and/or orders, such as which bag to place items in, indicate correct items, etc. The customized cart 1000 may also include one or more printer 1009 connected to the processor 1002 to print receipts and/or tickets for orders, etc.

The processors 702, 801, 902, and 1002 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 704, 706, 802, 803, 904, 906, 1004, and 1006 before they are accessed and loaded into the processors 702, 801, 902, and 1002. The processors 702, 801, 902, and 1002 may include internal memory sufficient to store the application software instructions. In many devices the internal memory may be a volatile or nonvolatile memory, such as flash memory, or a mixture of both. For the purposes of this description, a general reference to memory refers to memory accessible by the processors 702, 801, 902, and 1002 including internal memory or removable memory plugged into the device and memory within the processor 702, 801, 902, and 1002 themselves.

The systems, methods, devices, and non-transitory processor readable media of the various embodiments enable a distributed order management ("DOM") system to manage order fulfillment across multiple locations and/or multiple sources to provide delivery of items for an order from a best possible location at the time the order is received. In an embodiment, a series of user configurable decision flows may each be comprised of a series of factors, actions, and exits. By selecting the factors, actions, and exits and by assigning point values to one or more of the selected factors, actions, and/or exits that make up each of the decision flows, a user may develop the series of decisions flows to control how orders are handled by a DOM system. In an embodiment, as an order is received, the DOM system may select one of the series of user configurable decision flows and sequentially apply the factors, actions, and exits of that decision flow to determine a location from among multiple available locations from which an item or items for the order may be shipped.

The various embodiments may provide orchestrated order fulfillment across an extended supply chain enterprise and may provide intelligent sourcing to meet the delivery requirements (e.g., promised delivery date) associate with each received order. In an embodiment, an order management system, such as an enterprise resource planning system, e-commerce system, or other order generation system may interact with customers, and the DOM system may interact with the order management system to provide delivery for each order from the best possible location at the time the order is received. In this manner, the DOM system may be a single system responsible for making and/or keeping delivery promises. In an embodiment, a DOM system may be provided a continuous view of the inventory across an extended distribution network, such as inventory at one or more warehouse, one or more retail store, one or more transit location, and one or more supplier. In an embodiment, a DOM system may take into account inventory at all available locations to select a best location from which to fill a given order.

The various embodiments may enable retailers to provide for in-store pickup based on customer location and/or may enable merchandise to be shipped directly from a store. The various embodiments may enable returns to be made available as inventory for filling future orders. The various embodiments may provide full visibility of all inventories available in a supply chain, including vendor inventor, factory inventory, in transit inventory, distribution center/warehouse inventory, in-store inventory, returned inventory, and other reverse logistics type inventory. The various embodiments may enable better customer fulfillment, improved customer communications, reduced freight costs and improved transit times, and inventory balance in the supply chain, and may improve the return on investment.

The various embodiments provide a decision model for order fulfillment that is flexible enabling different users to develop different decision flows without needing to modify the underlying code of a DOM system. The various embodiments may enable a user to set the decisions that are important to their business and assign points based on their business needs. In an embodiment, users may be enabled to add and/or remove elements/processes from decision flows without having to reconfigure the DOM system. In an embodiment, users may be enabled to add, remove, and/or modify point values associated with elements/processes of decision flows to modify how a DOM system intelligently handles orders.

In an embodiment, a user may configure one or more decision flows to control the fulfillment of an order by a DOM system. In an embodiment, a series of factors, actions, and/or exits may be presented to a user in a graphical user interface, and the user may select from the available factors, actions, and/or exits to generate his or her own decision flows. The number of available factors, actions, and/or exits for selection by the user may be unlimited, enabling the user to configure unique decision flows to meet the user's specific needs related to how orders are fulfilled.

In an embodiment, factors may be pre-configured modules including one or more decision processes configured to test whether decision requirements related to order fulfillment are met or not. For example, a factor may be process to test the availability of an inventory location, such as a distribution center, retail store, etc., within a set radius of a shipping location for an order. When an order is received the DOM system may determine whether an inventory location, such as a retail store, may be within the set radius by mapping the set radius around the shipping location, such as the ship to address, in a mapping program (e.g., Google® maps) and checking for inventory locations within the set radius. The presence of an inventory location within the set radius may indicate the decision requirement for that factor is met, while the lack of an inventory location within the set radius may indicate the decision requirement for that factor is not met. As other examples, factors may include 100% shipment complete requirements, zone shipping requirements, shipping cost requirements, shipping time requirements, labor statuses/requirements, yard statuses/requirements, equipment statues/requirements, order priority information/requirements, etc. In an embodiment, users may assign point values to each factor, such as 1 point, 10 points, 100 points, or any other point value. Each factor in a decision flow may be assigned its own point value when added to the decision flow, and each may have different point values. In an embodiment, when a decision requirement for a point factor is met the point values may be accumulated for that decision flow. For example, a factor may be assigned 10 points, and when the decision requirement for that factor is met 10 points may be accumulated.

In an embodiment, exits may be pre-configured modules including one or more decision point analysis, such as one or more logical operator, configured to determine whether a point requirement is met by one or more factor of a decision flow executed sequentially. For example, an exit may be an analysis of whether the previous three factors resulted in a minimum number of points being accumulated. When the minimum number of points are accumulated, the exit may be met and a fulfillment location may be selected. As a specific example, a factor associated with the availability of inventory at a main distribution center may be associated with 100 points when met, and the exit following the factor may determine whether 100 points has been accumulated. When 100 points have been accumulated the DOM system executing the decision flow may stop executing the decision flow and proceed to select the main distribution center as the fulfillment location for the order. When less than 100 points have been accumulated the DOM system executing the decision flow may determine the exit requirement is not met and may proceed to the next sequential factor, exit, or action in the decision flow. In an embodiment, each exit may be assigned a point value, such as 1 point, 10 points, 100 points, or any other point value, when added to the decision flow by the user, and each exit in a decision flow may have different point values.

In an embodiment, actions may be pre-configured modules including one or more operation to perform on accumulated points at a given point in a decision flow. For example, an action may reset all accumulated points to a given user defined value, such as 0, 10, 100, or any other value, selected when the action was added to the decision flow. When an action is executed by the DOM system, any accumulated points may be modified to meet the given user defined value.

In an embodiment, in addition to adding factors, exits, and/or actions to a decision flow, a user may designate a decision flow for use based on a supply chain status. A supply chain state supply chain status may be a condition of supply chain and/or delivery area, such as a disaster condition, a holiday condition, or a seasonal condition. In this manner, a user may create different decision flows to handle order fulfillment differently based on the supply chain status. For example, one decision flow for summer month shipping (a seasonal condition) may be configured to only ship directly from a distribution center, while another decision flow for a hurricane (a disaster condition) may be configured to result in the same order shipping directly from a supplier. In an embodiment, when an order is provided to the DOM system, the current supply chain status may be indicated, enabling the DOM system to select an appropriate decision flow based at least in part on the supply chain status. In this manner, order may be handled differently depending on the supply chain status because different decision flows may be applied.

In an embodiment, in addition to adding factors, exits, actions, and/or a supply chain status to a decision flow, a user may designate a decision flow for use based on an order type indication. An order type indication may be an indication of an order requestor or originator. For example, an order type may be e-commerce indicating the order was originated from a retailer webpage. As another example, an order type may be inter-store indicating an order was originated by a retail store. In an embodiment, when the user creates a decision flow, the user may designate the applicable order type. In an embodiment, when an order is received at the DOM system the order may indicate the order type, and the DOM system may select a decision flow based at least in part on the order type. In this manner, different decision flows may be used to handle different types of orders. For example, e-commerce orders for an item may result in a different decision flow being selected by the DOM system than the same item ordered via a retail store.

In an embodiment, other data may be provided to the DOM system with each order, such as an order number or other information.

In an embodiment, decision flows may be created, modified, and/or removed without changing the underlying operating structure of the DOM system. The DOM system may merely select and execute different decision flows to result in different handling of order fulfillment. In this manner, changing how orders are handled may not require extensive reconfiguration of the underlying DOM system. Additionally, while two different retailers may use the same underlying DOM system, the difference in each retailer's unique decision flows may result in different handling of orders by the two different retailers.

In an embodiment, relationships between factors, exits, and/or actions may be indicated to a user, and the user may sort and/or search available factors, exits, and/or actions by the relationships. For example, each factor may be assigned a reason code and the factors may be sorted and/or searched by a user based on the reason code.

In an embodiment, upon executing a decision flow the DOM system may send an indication of an order to be shipped to a selected order fulfillment location. Additionally, the DOM system may send data related to the selected order fulfillment location back to the order system originally providing the order. In an embodiment, a DOM system may temporarily reserve an item at an inventory location and indicate the item as reserved to the order system. The DOM system may hold the item as reserved for a period of time or until the order system indicates the purchase of the item was successful. Then the DOM system may indicate to the order fulfillment location to ship the item or release the item back to inventory, accordingly.

In an embodiment, the DOM system may be configured to track metrics related to decision flows and order fulfillment. For example, each time an order is fulfilled by executing a decision flow, the exit at which the order was fulfilled may be recorded. In this manner, the user may be presented with a metric indicating the percentage of orders fulfilled at each exit and a user may determine an effectiveness of a decision flow based on the percentage. For example, a decision flow resulting in 90% of orders being fulfilled at the first exit may be more effective than a decision flow resulting in only 50% of orders being fulfilled at the first exit.

The various embodiments may provide a new model for fulfillment execution systems that optimizes fulfillment in real time, providing the efficiency, accuracy, and speed required for omnichannel retail and e-commerce operations. Various embodiment systems may acts as the operational brain, making automated, real-time decisions based on constant analysis of order priority, inventory, labor, process and equipment information to optimize fulfillment operations. Various embodiment systems may focus on real time data as decisions and/or dynamic events occur rather than focusing on a cycle of planning, executing, monitoring and adjusting as a sequence of discrete events. The various embodiments may use points-based tasking algorithms to fully manage inbound and outbound operations, automation flow, yard, labor and inventory to balance and prioritize workflow throughout the entire operation. Various embodiment drag-and-drop workflows (e.g., user selectable decision requirements and/or user generated decision flows) may enable easy software adjustments and process optimization, eliminating the need for complex software coding. The demands of omnichannel retailers may require fulfillment operations to ship orders faster and more efficiently than ever before and the various embodiments (e.g., various embodiment fulfillment execution systems) may enable fulfillment operations to adapt in real time and deliver intelligent decisions at the speed of automation for maximum efficiency. The various embodiment fulfillment execution systems may deliver a comprehensive suite of warehouse management, warehouse control, labor management, business intelligence and order fulfillment technologies with enterprise visibility, scalable for single-facility operations to multi-site enterprises.

Figure 11:
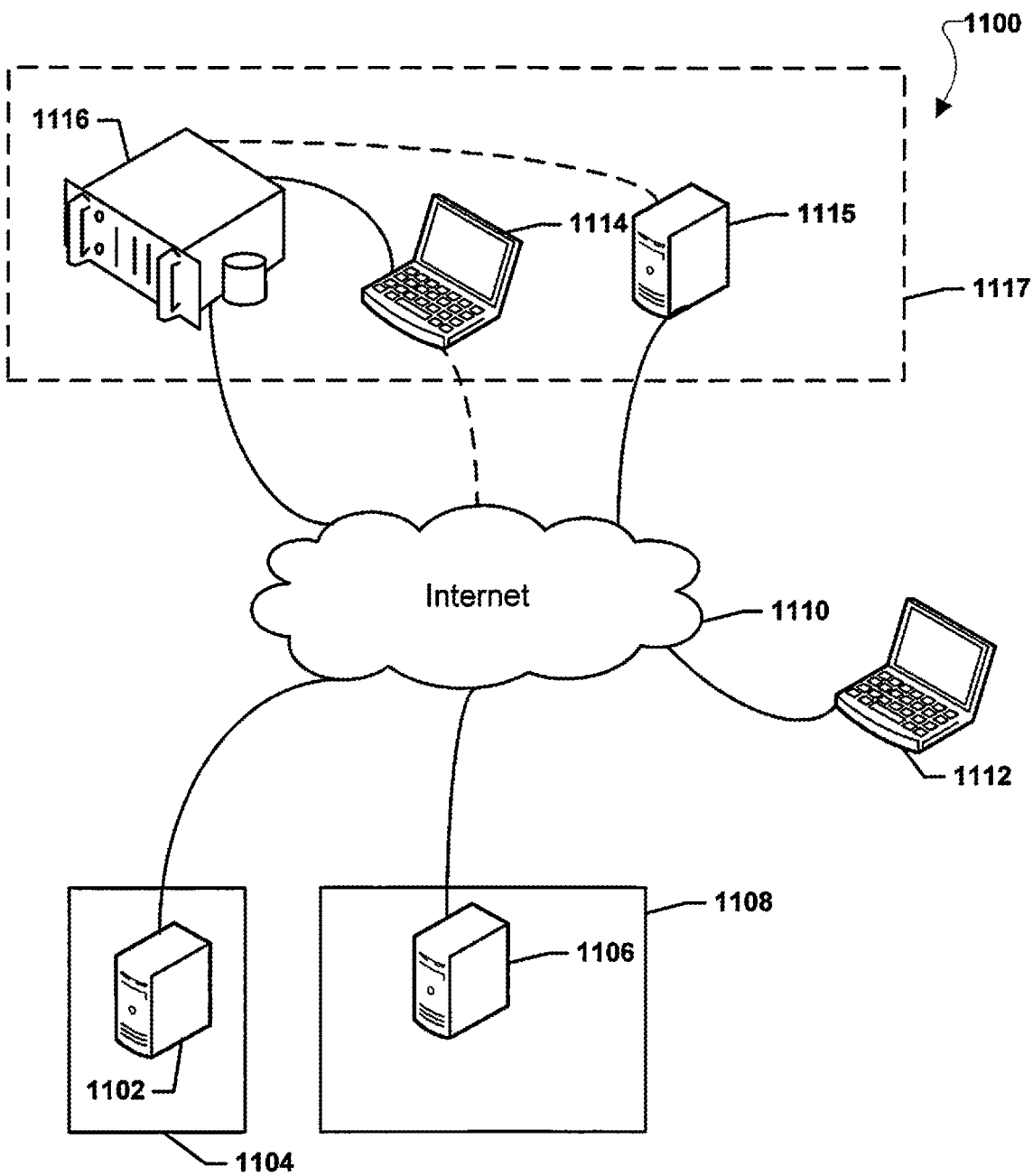
FIG. 11 is a system block diagram of a network suitable for use with the various embodiments.

FIG. 11 illustrates a network 1100 suitable for use with the various embodiments. The network 1100 may include one or more customer computing device 1112, one or more user terminal 1114, one or more order system 1115, a DOM system 1116, one or more retail computing device 1102, and one or more warehouse computing device 1106. The order system 1115, user terminal 1114, and DOM system 1116 may all comprise part of a supply chain management system 1117 which may comprise one piece of hardware (e.g., a single computing device) or multiple pieces of hardware (e.g., multiple computing devices).

The user terminal 1114 and the DOM system 1116 may be connected to the Internet 1110 and/or optionally may be directly connected via a local network connection. In this manner, via the connections to the Internet 1110 and/or the local network connection, the user terminal 1114 and DOM system 1116 may exchange data. The user terminal 1114 may enable a user to create, modify, and/or delete decision flows to control the fulfillment or orders. The order system 1115 may be connected to the Internet 1110 and/or optionally the DOM system 1116 via local network connection. In this manner, via the connections to the Internet 1110 and/or the local network connection, the DOM system 1116 and order system 1115 may exchange data. In this manner, the order system 1115 may send orders to the DOM system 1116, and the DOM system 1116 may send shipment indications to the order system 1115. The customer computing device 1112 may be connected to the Internet 1110 and may exchange data with the order system 1115 via the Internet 1110. In this manner, the order system 1115 may receive a customer's order from the customer computing device 1112 and provide the order to the DOM system 1116.

The retail computing device 1102 may be located in a retail store 1104 and may be connected to the Internet 1110. In this manner, the retail computing device 1102 may exchange data with the DOM system 1116, such as inventory information and orders to be filled. The warehouse computing device 1106 may be located in a warehouse 1108 and may be connected to the Internet 1110. In this manner, the warehouse computing device 1106 may exchange data with the DOM system 1116, such as inventory information and orders to be filled.

As an example, in operation, orders may be created by the customer computing device 1112 and received at the order system 1115. The order system 1115 may indicate the current supply chain status and pass the order to the DOM system 1116. The DOM system 1116 may select a user generated decision flow created via the user terminal 1114 from a series of decision flows stored in a memory available to the DOM system 1116, execute the selected user generated decision flow to select a fulfillment location from among the retail store 1104 or warehouse 1108. The retail store 1104 may be selected and the DOM system 1116 may send the order to the retail computing device 1102 to result in the item or items for the order being shipped from the retail store 1104 to the ordering customer (or set aside for in store pick up by the customer).

Figure 12:
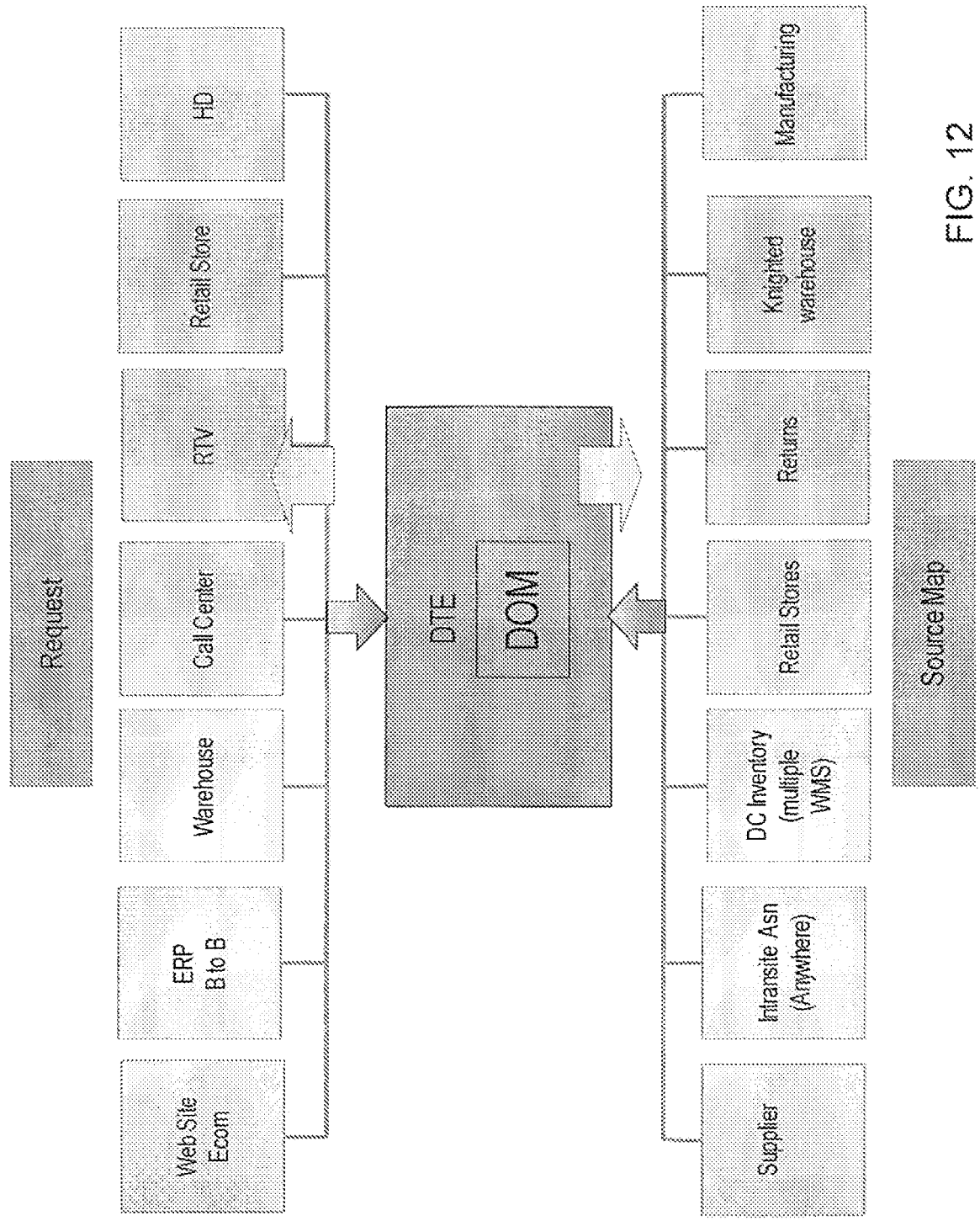
FIG. 12 is a process flow diagram illustrating interactions between various request generators and item sources and a DOM system.

FIG. 12 is a process flow diagram illustrating interactions between various request generators and item sources and a DOM system. Requests for items (or orders) may be generated by websites or other e-commerce systems, enterprise resource planning systems, warehouses or distribution centers, call centers, return to vendor ("RTV") systems, retails stores, etc. and sent to a DOM system. The DOM system may also send data, such as shipment information, to the various requestors. Additionally, fulfillment sources, such as suppliers, in transit inventory locations (e.g., depots, trucks, cargo container yards, etc.), distribution centers, retail stores, returns, warehouses, and manufacturing sites, which may have inventory may send data to the DOM system, such as inventory levels, shipment capabilities, etc. The DOM system may select from the fulfillment sources based on the results of executing a selected decision flow and send orders to a selected fulfillment source.

Figure 13:
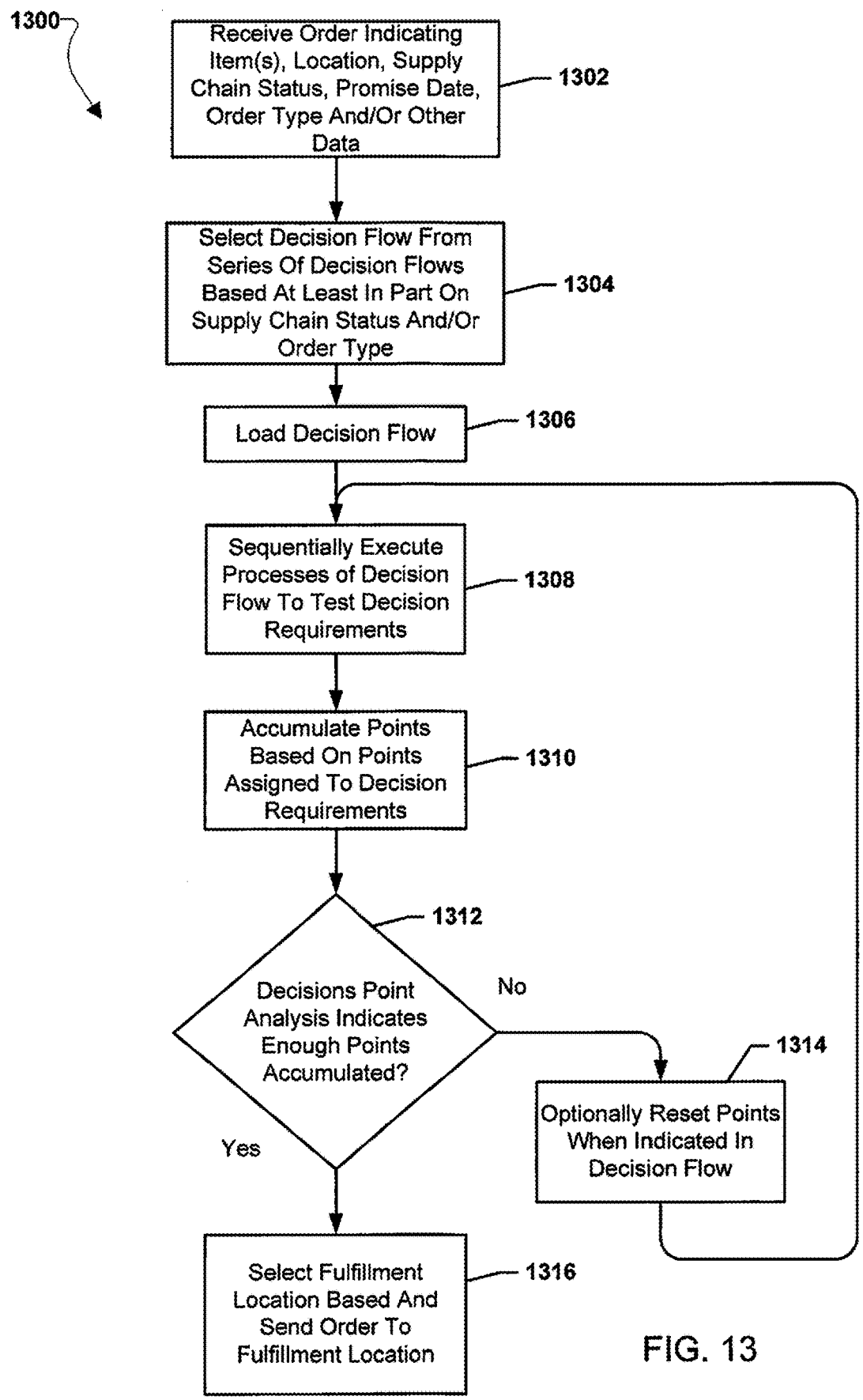
FIG. 13 is a process flow diagram illustrating an embodiment method for executing processes of a selected decision flow to select a fulfillment location for an order.

FIG. 13 illustrates an embodiment method 1300 for executing processes of a selected decision flow to select a fulfillment location for an order. In an embodiment, the operations of method 1300 may be performed by the processor of a DOM system. In block 1302 the DOM system may receive an order indicating one or more items, a location, a supply chain status, a promise date, an order type, and/or other data. In an embodiment, the order may be received from an ordering system receiving orders from customers for items to be sold and/or other retailer locations for inter-company transfers (e.g., restocking orders).

In block 1304 the DOM system may select a decision flow from a series of decision flows based at least in part on the supply chain status and/or order type. As described above, the supply chain status may indicate a state of the supply chain, such as a disaster condition, holiday condition, seasonal condition, etc. and different decision flows may be selected to handle an order based on the current supply chain status. Additionally, the order may indicate the order type, such as an e-commerce order, and a decision flow may be selected based at least in part on the order type. In block 1306 the DOM system may load the selected decision flow.

In block 1308 the DOM system may sequentially execute the processes of the decision flow to test the decision requirements of the decision flow. For example, starting from a beginning point of the decision flow the DOM system may execute the first factor of the selected decision flow. In block 1310 the DOM system may accumulate points based on the points assigned to the decision requirements. For example, the DOM system may accumulate points as indicated in the decision flow when a factor is met. In determination block 1312 the DOM system may determine whether a decision point analysis indicated enough points have been accumulated. As an example, the DOM system may determine whether an exit has been reached, and whether the points required to meet the exit have been accumulated.

In response to determining the decision point analysis does not indicate enough points are accumulated (i.e., determination block 1312="No"), in block 1314 the DOM system may optionally reset points when indicated in the decision flow. For example, the DOM system may reset the accumulated points to zero when indicated by an action. The DOM system may return to block 1308 and continue to sequentially execute the processes of the decision flow to test the decision requirements of the decision flow. In response to determining the decision point analysis does indicate enough points are accumulated (i.e., determination block 1312="Yes"), in block 1316 the DOM system may select a fulfillment location and send the order to the selected fulfillment location. As an example, the DOM system may select a fulfillment location associated with the factors resulting in enough accumulated points, such as a fulfillment location within a tested order zone, to fill the order. In response to receiving the order, the selected fulfillment location may ship the order to the order location.

Figure 14:
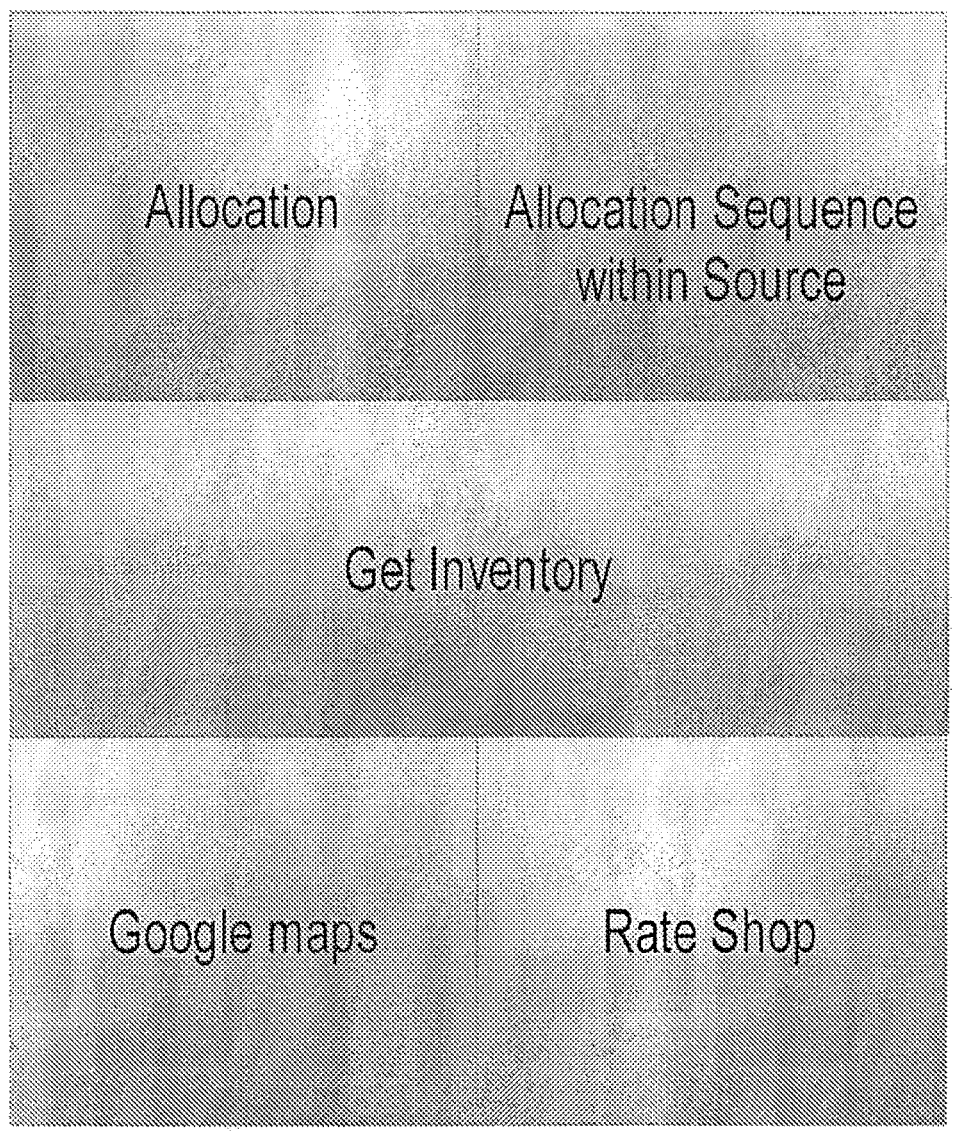
FIG. 14 is a data structure diagram of data stores available within a DOM system.

FIG. 14 is a data structure diagram of data stores available within a DOM system. A DOM system may have access to allocations, allocations sequences within a source, inventory get or gathering modules, Google® maps or other mapping programs, and rate shopping programs enabling the DOM system to select from available shipping methods based on cost and/or speed.

Figure 15:
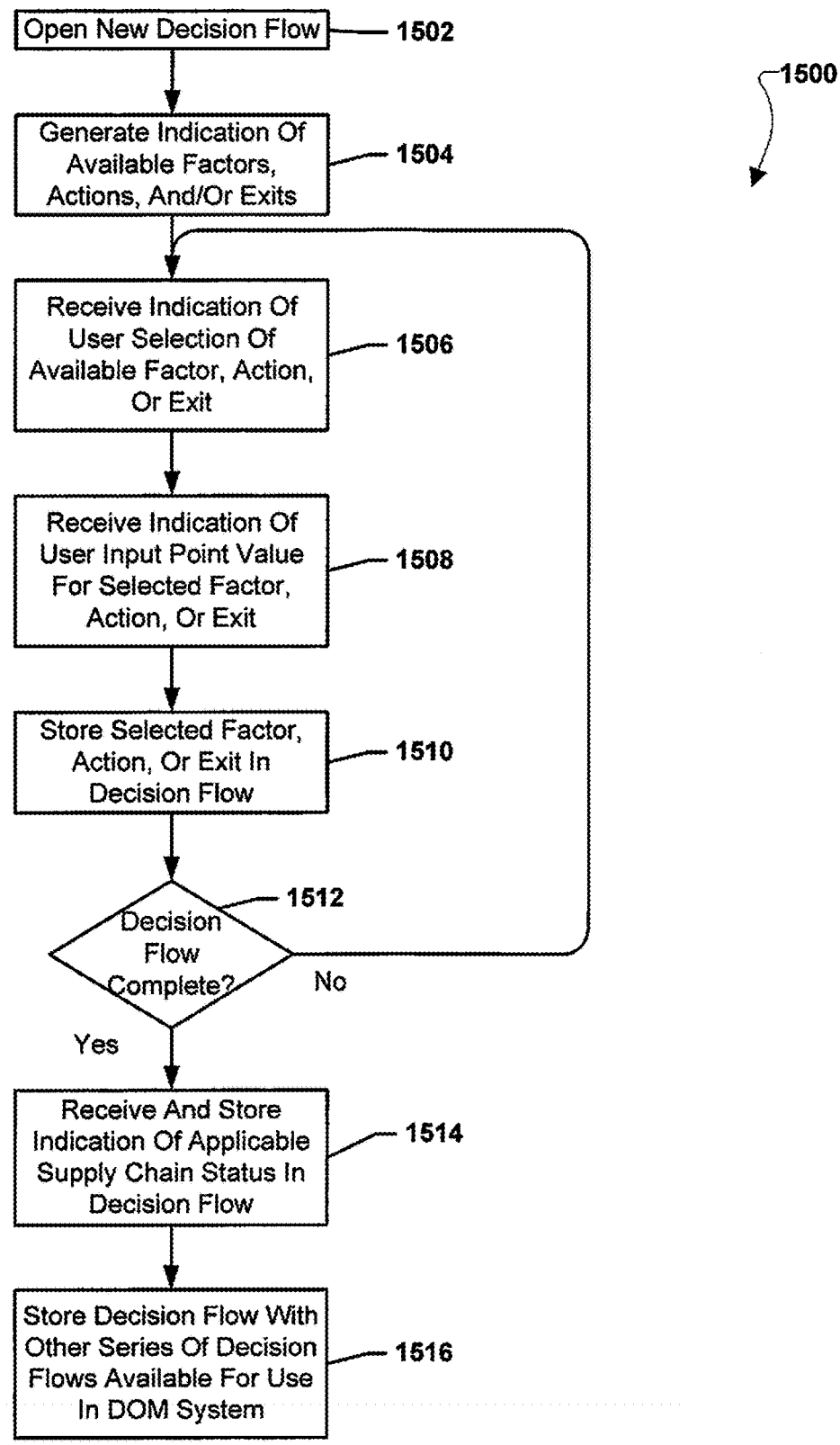
FIG. 15 is a process flow diagram illustrating an embodiment method for generating a user configurable decision flow.

FIG. 15 illustrates an embodiment method 1500 for generating a user configurable decision flow. In an embodiment, the operations of method 1500 may be performed by a DOM system and/or a user terminal in communication with a DOM system. In an embodiment, the operations of method 1500 may be performed in conjunction with the operations of method 1300 described above.

In block 1502 the DOM system may receive an indication to open a new decision flow. In an embodiment, the indication to open a new decision flow may be selection received in a graphical user interface of a DOM configuration tool. In block 1504 the DOM system may generate an indication of available factors, actions, and/or exits. For example, the available factors, actions, and/or exits may be displayed on a graphical user interface of a DOM configuration tool. In block 1506 the DOM system may receive an indication of a user selection of an available factor, action, or exit. In block 1508 the DOM system may receive an indication of a user input point value for the selected factor, action, or exit. In block 1510 the DOM system may store the selected factor, action, or exit and the user input point value in the decision flow.

In determination block 1512 the DOM system may determine whether the decision flow is complete. For example, a user may indicate the decision flow is complete by selecting a "build decision flow" button. In response to determining the decision flow is not complete (i.e., determination block 1512="No"), the DOM system may continue to receive factor, action, or exit selections in block 1506. In response to determining the decision flow is complete (i.e., determination block 1512="Yes"), in block 1514 the DOM system may receive and store an indication of the applicable supply chain status in the decision flow. For example, the user may select the applicable supply chain status from a drop down menu. Additionally the user may select other applicable data for the decision flow, such as an applicable order type for which the decision flow may apply to. In block 1516 the DOM system may store the decision flow with other series of decision flows available for use in the DOM system.

Figure 16:
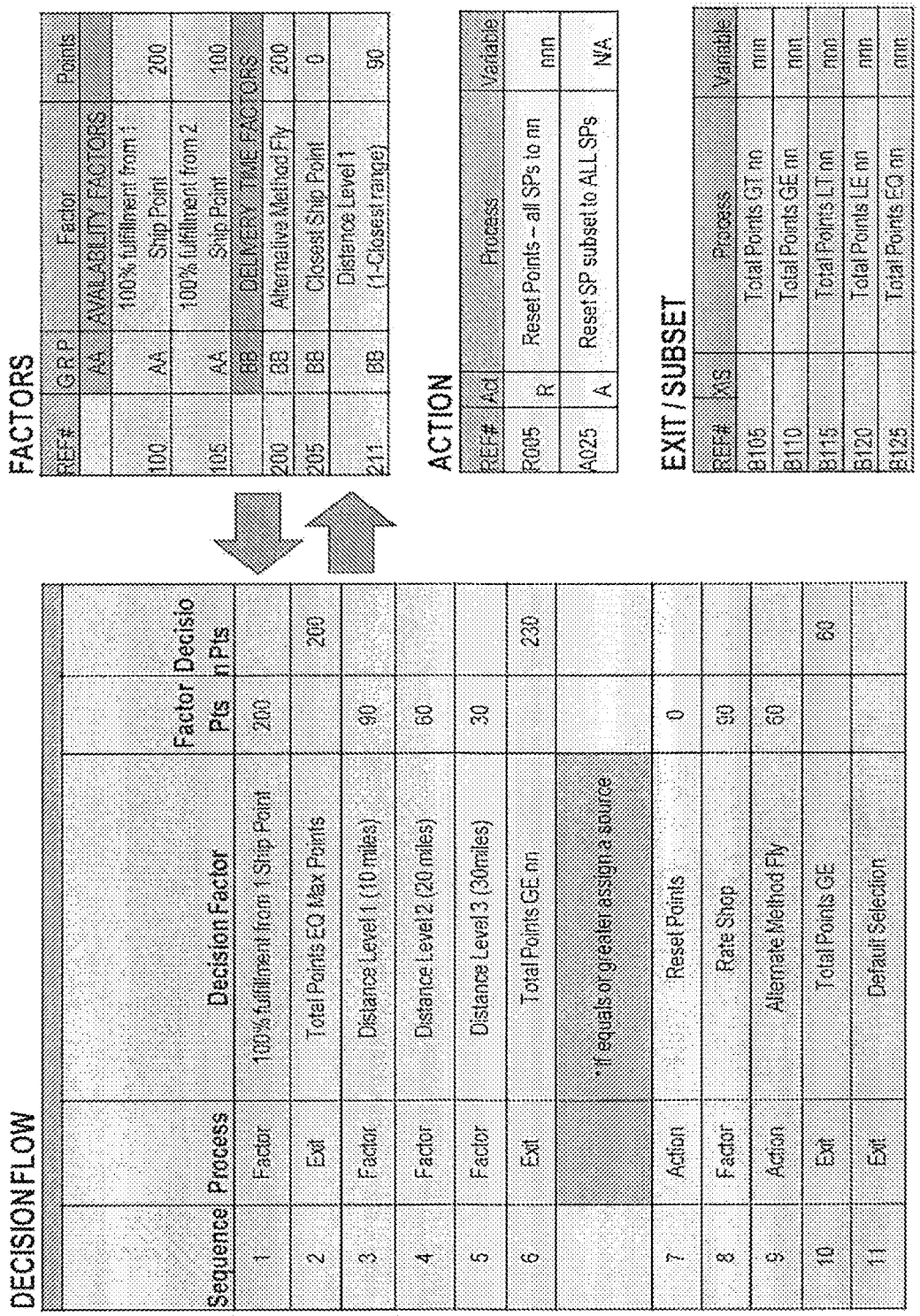
FIG. 16 is a data structure diagram of an example decision flow and available factors, actions, and exits.

FIG. 16 is a data structure diagram of an example decision flow and available factors, actions, and exits. Available factors may be indicated with an assigned reference number, grouping, description, and user assigned and modifiable point value. Available actions may be indicated with an assigned reference number, action grouping, process description, and user assigned and modifiable point value or variable. Available exits may be indicated with reference numbers, process descriptions, and user assigned and modifiable point values or variables. In the decision flow, the sequence of the factors, exits, and actions may be indicated as well as the assigned point values, process type, and description.

Figure 17:
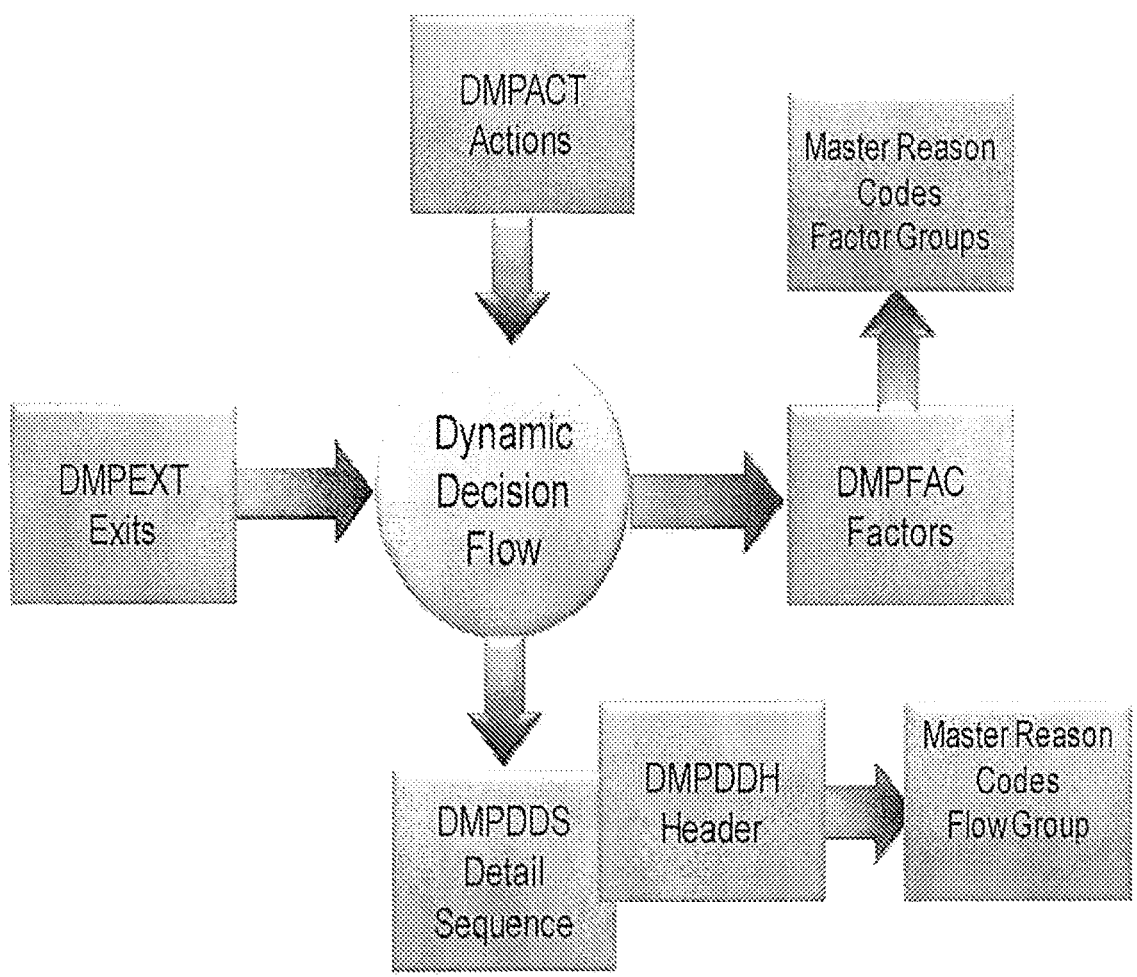
FIG. 17 is a block diagram illustrating relationships between data elements in a DOM system.

FIG. 17 is a block diagram illustrating relationships between data elements in a DOM system. Actions, exits, factors, and detail sequences may be related to a dynamic decision flow. Factors may also be related to master reason codes/factor group codes. The master reason codes/factor group codes may be related to headers. In this manner, by the various relationships, the actions, exits, factors, and decision flows may be searched and/or organized.

Figure 19:
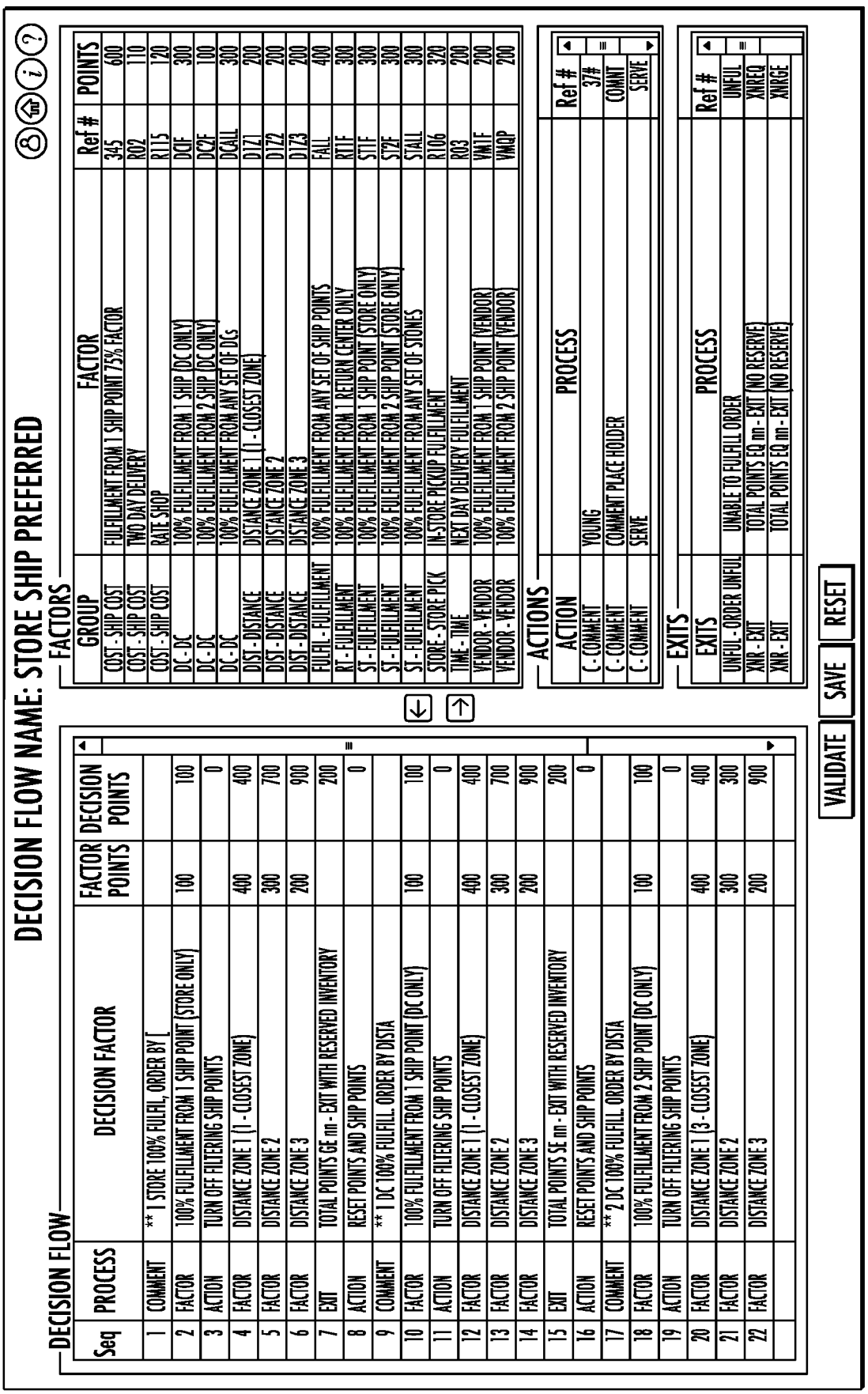

FIGS. 18-22 are screen shots of an example decision flow creation tool according to an embodiment for generating a user configurable decision flow for an embodiment DOM system. FIG. 18 illustrates a screen shot of a decision flow creation tool showing the supply chain status which may be assigned to a decision flow, such as emergency condition, holiday condition, or standard condition, with the decision flow name, description, and creator indicated as well. FIG. 19 illustrates an example screen shot of a decision flow creation tool showing available actions, factors, and exits to select from on the right of the screen and the sequence of the decision flow on the left. FIG. 20 illustrates an example screen shot of a decision flow creation tool shown in FIG. 19 expanded to show the sequence of the decision flow table.

Figure 21:
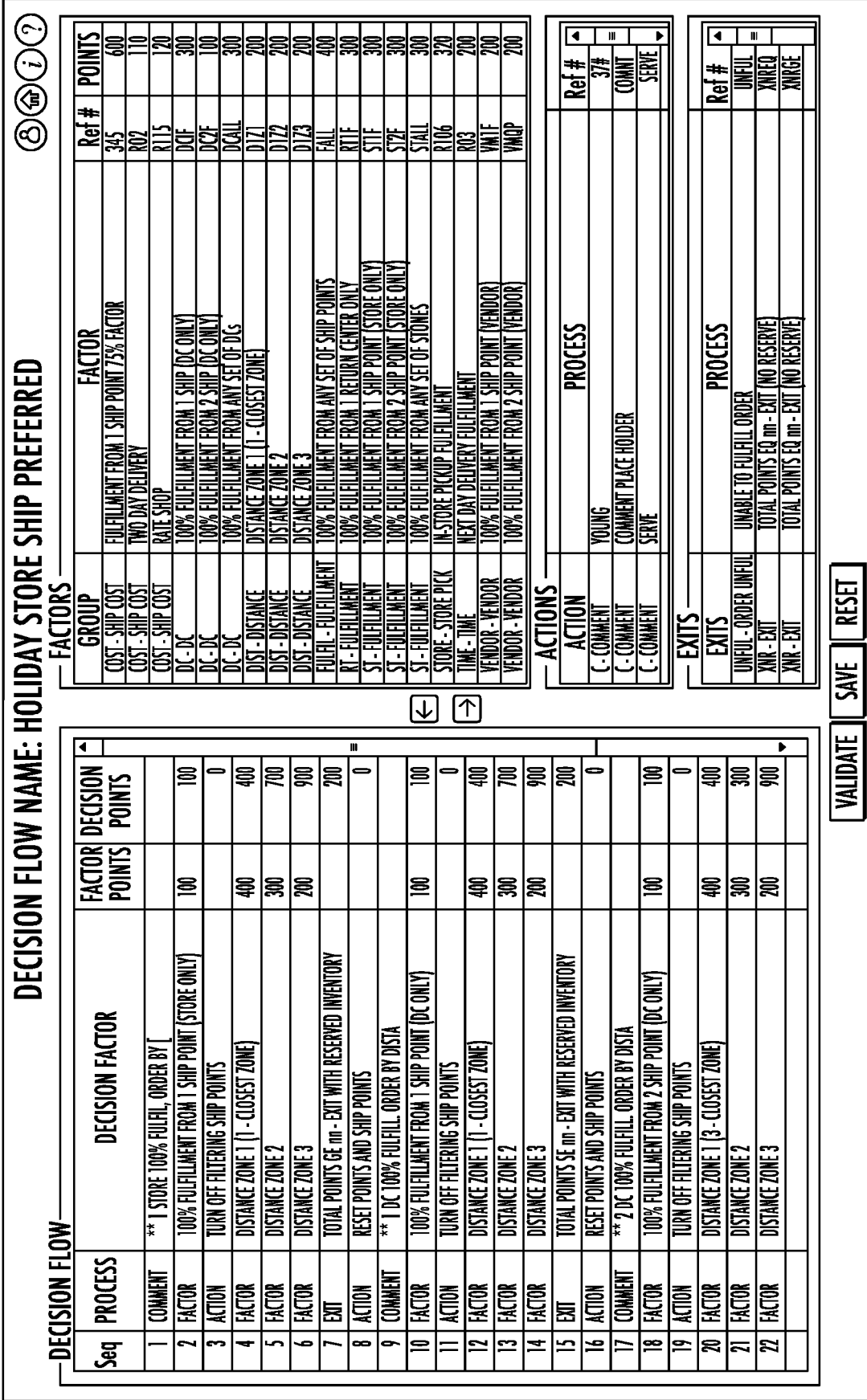
Figure 22:
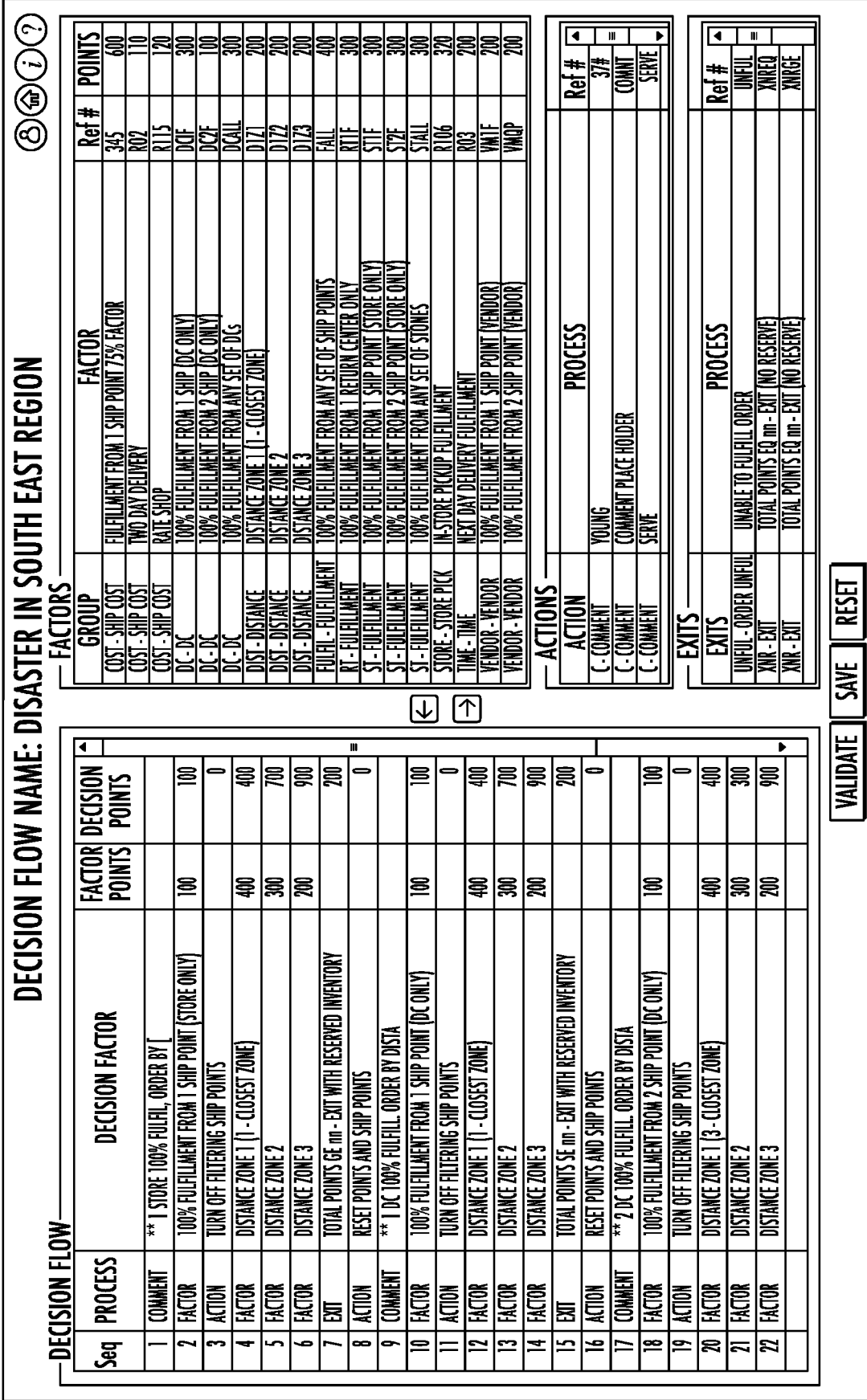

FIG. 21 illustrates an example screen shot of a decision flow creation tool showing available actions, factors, and exits to select from on the right of the screen and the sequence of the decision flow on the left created to support a holiday condition as a supply chain status. FIG. 22 illustrates an example screen shot of a decision flow creation tool showing available actions, factors, and exits to select from on the right of the screen and the sequence of the decision flow on the left created to support a disaster in the south east as a supply chain status.

Figure 23:
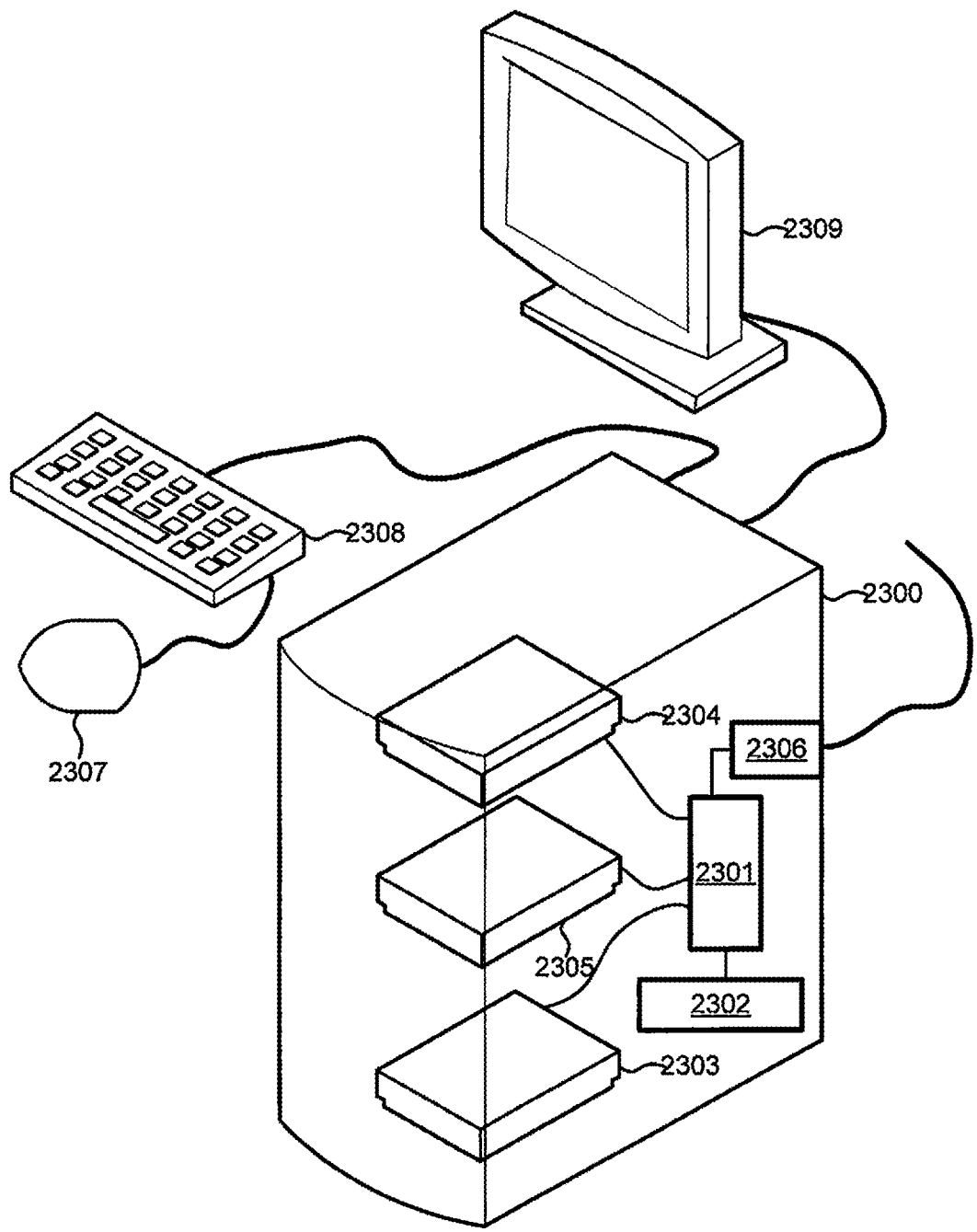
FIG. 23 is a component diagram of an example computing device suitable for use with the various embodiments.

The various embodiments may be implemented in any of a variety of computing devices, an example of which is illustrated in FIG. 23. A computing device 2300 will typically include a processor 2301 coupled to volatile memory 2302 and a large capacity nonvolatile memory, such as a disk drive 2305 of Flash memory. The computing device 2300 may also include a floppy disc drive 2303 and a compact disc (CD) drive 2304 coupled to the processor 2301. The computing device 2300 may also include a number of connector ports 2306 coupled to the processor 2301 for establishing data connections or receiving external memory devices, such as a USB or FireWire® connector sockets, or other network connection circuits for establishing network interface connections from the processor 2301 to a network or bus, such as a local area network coupled to other computers and servers, the Internet, the public switched telephone network, and/or a cellular data network. The computing device 2300 may also include the trackball 2307, keyboard 2308 and display 2309 all coupled to the processor 2301.

Figure 24:
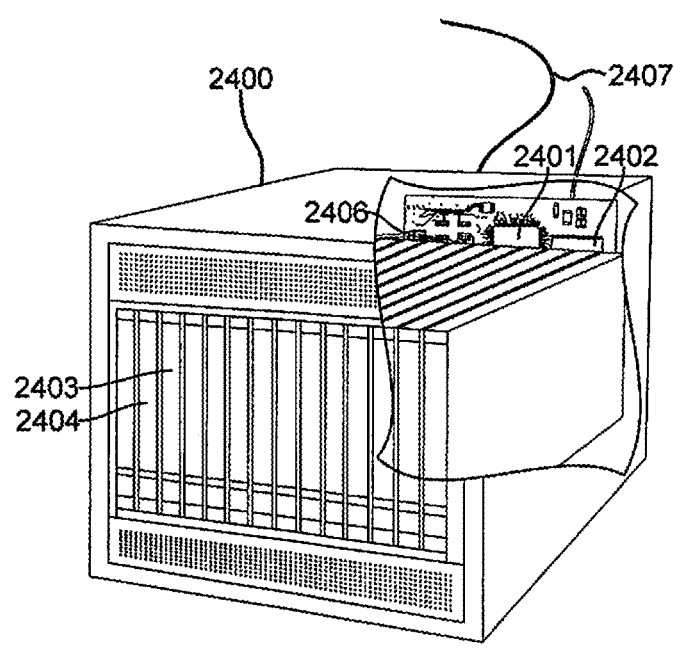
FIG. 24 is a component diagram of an example server suitable for use with the various embodiments.

The various embodiments may also be implemented on any of a variety of commercially available server devices, such as the server 2400 illustrated in FIG. 24. Such a server 2400 typically includes a processor 2401 coupled to volatile memory 2402 and a large capacity nonvolatile memory, such as a disk drive 2403. The server 2400 may also include a floppy disc drive, compact disc (CD) or DVD disc drive 2404 coupled to the processor 2401. The server 1400 may also include network access ports 2406 coupled to the processor 2401 for establishing network interface connections with a network 2407, such as a local area network coupled to other computers and servers, the Internet, the public switched telephone network, and/or a cellular data network.

The processors 2301 and 2401 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the volatile and internal memories 2302, 2402, and disk drives 2305, 2403 before they are accessed and loaded into the processors 2301 and 2401. The processors 2301 and 2401 may include internal memory sufficient to store the application software instructions. In many devices the internal memory may be a volatile or nonvolatile memory, such as flash memory, or a mixture of both. For the purposes of this description, a general reference to memory refers to memory accessible by the processors 2301 and 2401 including internal memory or removable memory plugged into the device and memory within the processor 2301 and 2401 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A voice picking system, comprising a server processor that is configured to:
   receive a voice call from a customer's mobile device;
   generate a plurality of orders containing one or more items based on voice inputs received from the customer during the voice call;
   perform a first sort of the one or more items in the plurality of orders, wherein the first sort indicates an order in which sorted items are to be picked;
   assign a bag in a cubby of a cart to a selected order, wherein the selected order comprises the sorted items from among the plurality of orders, wherein the bag is assigned based on an item type of an item and a number of items within a pick order to ensure that an appropriate number of items within the pick order do not overflow the bag of the selected order;
   send a voice indication to a personal shopper system to pick the sorted items and place the sorted items in the bag based on the item type; and
   perform a second sort of the sorted items of the selected order based on at least a current location of the personal shopper system, wherein the server processor is configured to receive an indication of the current location of the personal shopper system from a Global Positioning System (GPS) transceiver installed in the cart.

2. The voice picking system of claim 1, wherein the cart further comprises:
   a scale provided in the cubby to detect a weight of the sorted items placed in the bag, wherein the weight is detected to verify placement of the sorted items in the bag in the cubby.

3. The voice picking system of claim 1, wherein the cart further comprises:
   an illuminating light provided in the cubby to indicate to a personal shopper of the personal shopper system to place the sorted items for the selected order in the bag in the cubby assigned for the selected order.

4. The voice picking system of claim 1, wherein the server processor is configured to identify the customer based on a stored voice signature of the customer.

5. The voice picking system of claim 1, wherein the server processor is configured to identify a store to fulfill the order placed by the customer based on a current location of the customer.

6. The voice picking system of claim 1, wherein the server processor sends the voice indication to the personal shopper system to fulfil the order based on at least one of availability of the personal shopper system, performance metrics of the personal shopper system, time worked by the personal shopper system, average picking speed of the personal shopper system, distance traveled by the personal shopper system, or qualification level of the personal shopper system.

7. The voice picking system of claim 1, wherein the server processor is further configured to:
receive an indication of the current location of the personal shopper system by periodically reading RFID tags installed in a store through an RFID reader installed in the cart; and
sort the one or more items of the selected order based at least in part on the indication of the current location of the personal shopper system.

8. The voice picking system of claim 7, wherein the server processor is further configured to receive an indication of the current location of the personal shopper system from a GPS receiver installed in the cart.

9. The voice picking system of claim 1, wherein the cart comprises the personal shopper system which includes a headset with a speaker and a microphone to provide voice indications to a personal shopper.

10. The voice picking system of claim 9, wherein the personal shopper system establishes a communication with the server processor through transceivers installed in the cart.

11. The voice picking system of claim 1, wherein the server processor is configured to:
receive voice indication signals from the personal shopper system confirming the pick of the one or more items of the selected order from their associated locations.

12. The voice picking system of claim 1, further comprising a portable receipt printer, where the server processor is configured to operate the portable receipt printer to print a receipt for affixing it to a completed order, and wherein the portable receipt printer may be installed on the cart.

13. A method of using an end-to-end ordering and fulfillment system, the method comprising:
receiving a voice call from a customer's mobile device;
generating a plurality of orders containing one or more items based on voice inputs received from the customer during the voice call;
performing a first sort of the one or more items in the plurality of orders, wherein the first sort indicates an order in which sorted items are to be picked;
assigning a bag in a cubby of a cart to receive a selected order, wherein the selected order comprises the sorted items from among the plurality of orders, the bag assigned based on a type of one or more items and a number of one or more items within the selected order to ensure that the sorted items of the selected order fit within the bag in which the sorted items are placed;
sending an indication to a personal shopper system to pick the sorted items; and
performing a second sort of the sorted items of the selected order based on at least a current location of the personal shopper system, wherein the current location of the personal shopper system is received as an indication from a Global Positioning System (GPS) transceiver installed in the cart.

14. The method of claim 13, further comprising:
receiving voice indication signals from the personal shopper system confirming the pick of the sorted items of the selected order from their associated locations.

15. The method of claim 13, further comprising:
receiving an indication of the current location of the personal shopper system by periodically reading RFID tags installed in a store through an RFID reader installed in the cart; and
sorting the one or more items of the selected order based at least in part on the indication of the current location of the personal shopper system.

16. The method of claim 13, further comprising:
establishing a communication with a server processor through transceivers installed in the cart; and
sending indication signals from the cart confirming the picking of the one or more items of the selected order.

17. The method of claim 13, further comprising:
identifying the customer based on a stored voice signature of the customer;
and
identifying a store to fulfill the order placed by the customer based on a current location of the customer.

* * * * *